United States Patent
Michaelis et al.

(10) Patent No.: US 11,947,464 B2
(45) Date of Patent: Apr. 2, 2024

(54) DATA MANAGEMENT METHOD FOR WRITING STATE INFORMATION IN DATA STORE AND COMPUTER-READABLE RECORDING MEDIUM STORING DATA MANAGEMENT PROGRAM FOR WRITING STATE INFORMATION IN DATA STORE

(71) Applicant: Fujitsu Limited, Kawasaki (JP)

(72) Inventors: Julius Michaelis, Rosenheim (DE); Yasuhiko Kanemasa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/960,196

(22) Filed: Oct. 5, 2022

(65) Prior Publication Data
US 2023/0229597 A1    Jul. 20, 2023

(30) Foreign Application Priority Data
Jan. 17, 2022    (JP) .................................. 2022-005358

(51) Int. Cl.
*G06F 12/0891*    (2016.01)

(52) U.S. Cl.
CPC .... *G06F 12/0891* (2013.01); *G06F 2212/603* (2013.01)

(58) Field of Classification Search
CPC ........... G06F 12/0891; G06F 2212/603; G06F 16/2291; G06F 16/2386; G06F 16/28;

(Continued)

(56) References Cited

U.S. PATENT DOCUMENTS

| | | |
|---|---|---|
| 10,210,087 B1 | 2/2019 | Shilane et al. |
| 2006/0026386 A1* | 2/2006 | Freedman ........... G06F 16/2453 711/213 |

(Continued)

FOREIGN PATENT DOCUMENTS

| | | |
|---|---|---|
| EP | 3889796 A2 | 10/2021 |
| JP | 2007-328716 A | 12/2007 |
| JP | 2019-133579 A | 8/2019 |

OTHER PUBLICATIONS

Papagiannis, Anastasios et al., "Tucana: Design and implementation of a fast and efficient scale-up key-value store", USENIX, USENIX the Advanced Computing Systems Association, Jun. 22, 2016, pp. 537-550, XP061024996.

(Continued)

*Primary Examiner* — Sean D Rossiter
(74) *Attorney, Agent, or Firm* — Fujitsu Intellectual Property Center

(57) ABSTRACT

A data management method causes a computer to execute processing including: creating, when a predetermined data processing program performs data processing, based on an access frequency to a data store, high-frequency state item list information obtained by listing high-frequency state items of which the access frequency is high; determining, when state information that includes a value of the high-frequency state item is written to the data store, whether or not the state information corresponds to the high-frequency state item with reference to the high-frequency state item list information; grouping and writing pieces of the state information of a plurality of the high-frequency state item.

11 Claims, 27 Drawing Sheets

(58) Field of Classification Search
CPC ............... G06F 12/0862; G06F 12/122; G06F 16/24568; G06F 2212/1024; G06F 2212/154; G06F 2212/173; G06F 2212/465; G06F 2212/466; G06F 2212/6024; G06F 12/0868
See application file for complete search history.

(56) References Cited

U.S. PATENT DOCUMENTS

| | | |
|---|---|---|
| 2007/0288459 A1 | 12/2007 | Kashiyama et al. |
| 2011/0225347 A1* | 9/2011 | Goss .................. G06F 12/0246 711/170 |
| 2015/0106582 A1* | 4/2015 | Mai ...................... G06F 3/0649 711/165 |
| 2016/0196207 A1* | 7/2016 | Gupta .................. G06F 3/0652 711/103 |
| 2017/0070574 A1* | 3/2017 | Sawada .................. G06F 3/061 |
| 2017/0139610 A1 | 5/2017 | Choi et al. |
| 2019/0243693 A1 | 8/2019 | Nakagawa et al. |
| 2019/0303753 A1* | 10/2019 | Bonnell ............. G06F 16/2291 |
| 2019/0362000 A1* | 11/2019 | Lee ..................... G06F 16/2237 |
| 2020/0201782 A1* | 6/2020 | Tsao ..................... G06F 12/124 |

OTHER PUBLICATIONS

Extended European Search Report dated Jun. 12, 2023 for corresponding European Patent Application No. 22199082.3, 12 pages.
EPOA—Official Communication of European Patent Application No. 22199082.3 dated Sep. 5, 2023. ** All references cited in the EPOA was previously submitted in the IDS.

* cited by examiner

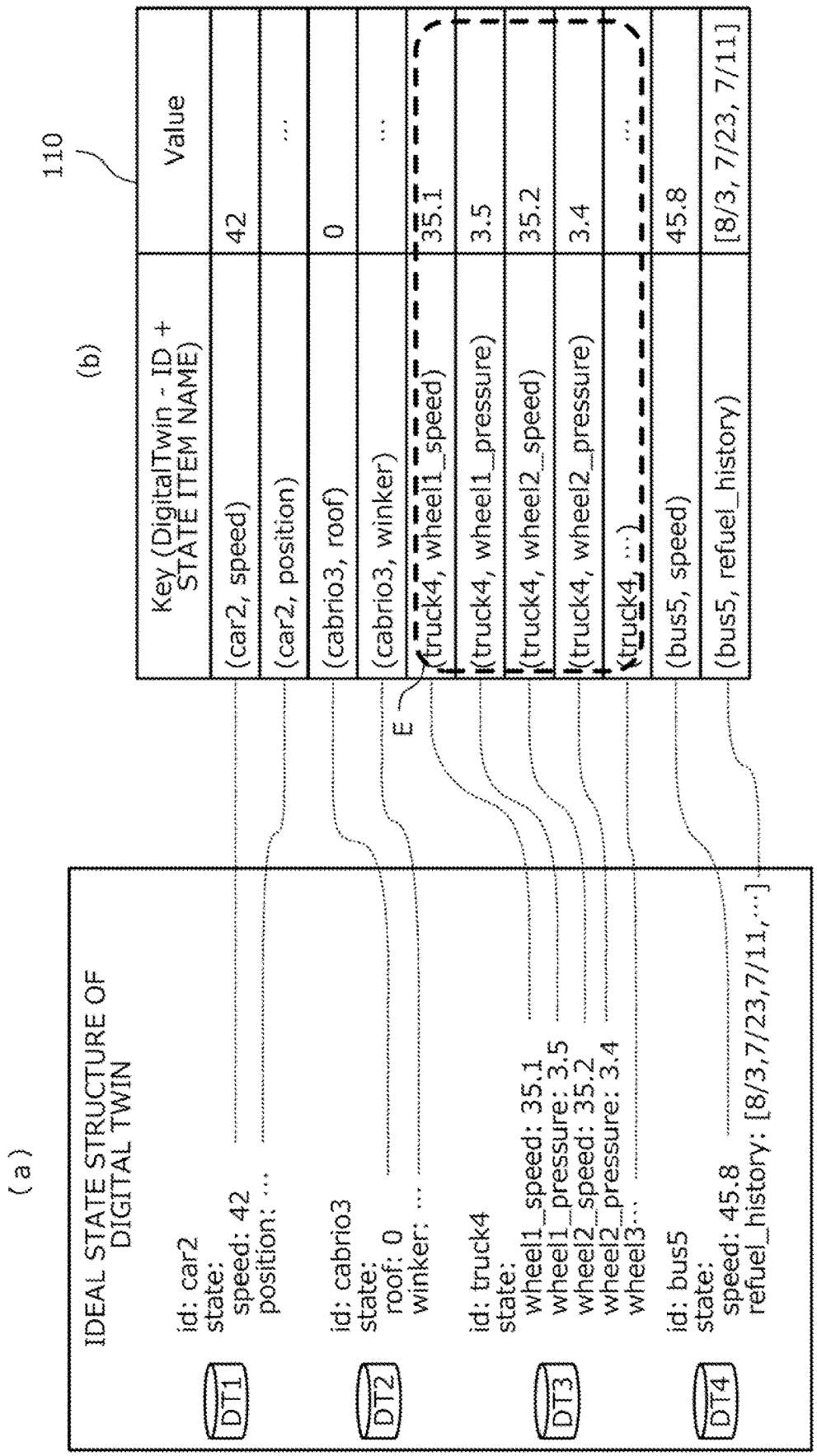

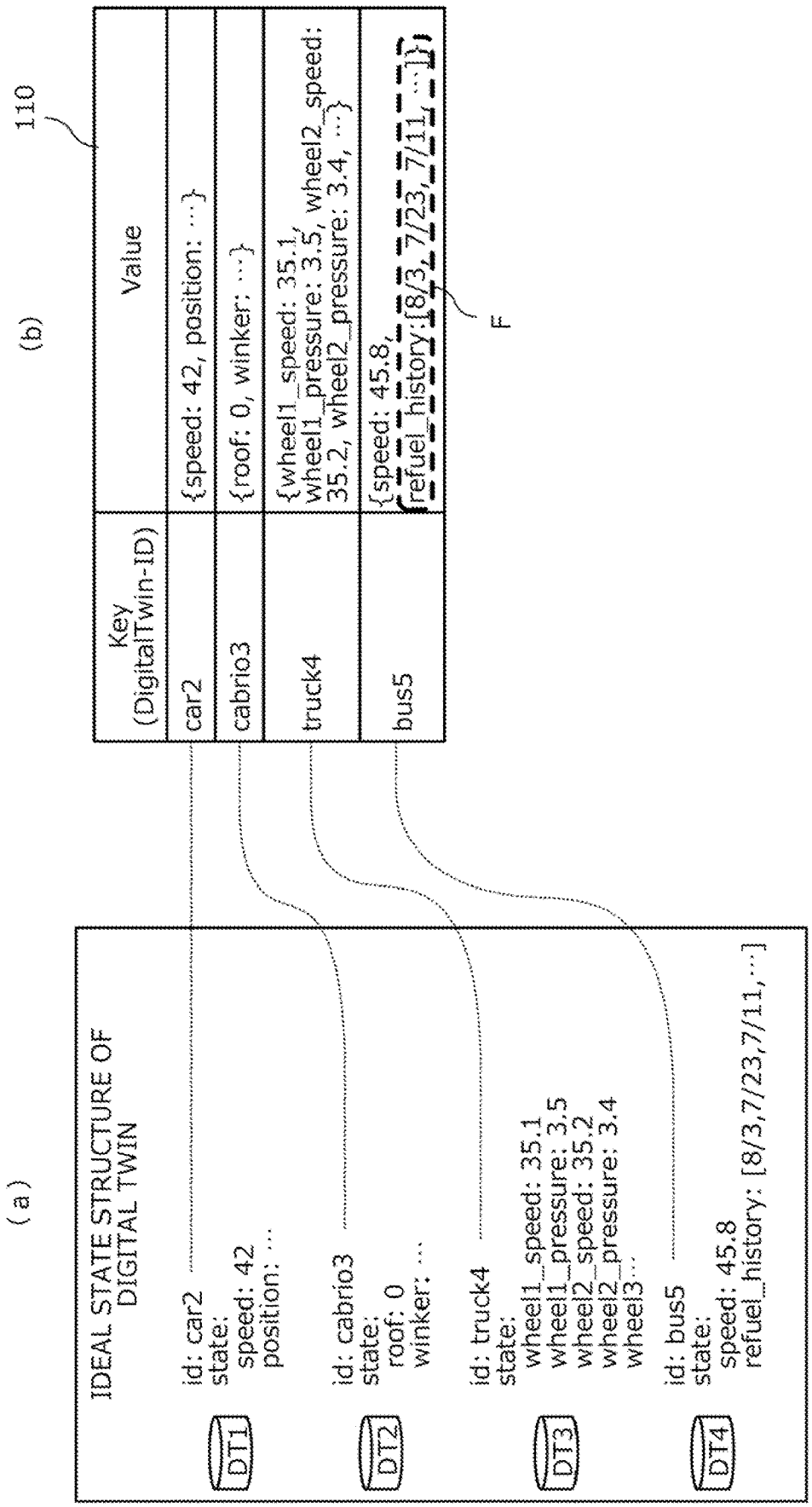

| id OF DIGITAL TWIN | TYPE NAME |
|---|---|
| car2 | CAR |
| cabrio3 | CAR |
| truck4 | TRUCK |
| bus5 | BUS |
| car13 | CAR |
| car1111 | CAR |
| bus1235 | BUS |
| ... | ... |

| TYPE NAME | USER LOGIC TO BE EXECUTED |
|---|---|
| CAR | USER LOGIC 1 |
| BUS | USER LOGIC 2 |
| TRUCK | ... |

| TYPE | STATE ITEM | FIRST DETECTION INDEX | LAST DETECTION INDEX | NUMBER OF ACCESSES | TOTAL SIZE (Byte) |
|---|---|---|---|---|---|
| CAR | speed | 3 | 923456 | 123210 | 410700 |
| | position | 3 | 923456 | 123210 | 1110700 |
| | ... | | | | |
| EVENT INDEX | | | | | |
| 923458 | | | | | |

| TYPE | STATE ITEM | FIRST DETECTION INDEX | LAST DETECTION INDEX | NUMBER OF ACCESSES | TOTAL SIZE (Byte) |
|---|---|---|---|---|---|
| BUS | speed | 99 | 723458 | 123210 | 410700 |
| | gas_history | 3456 | 721213 | 5 | 5123 |
| | ... | | | | |
| EVENT INDEX | | | | | |
| 723458 | | | | | |

| TYPE | STATE ITEM | FIRST DETECTION INDEX | LAST DETECTION INDEX | NUMBER OF ACCESSES | TOTAL SIZE (Byte) |
|---|---|---|---|---|---|
| TRUCK | speed | 5 | 823457 | 123210 | 410700 |
| | wheel1_pressure | 5 | 823450 | 61605 | 205821 |
| | ... | | | | |
| EVENT INDEX | | | | | |
| 823458 | | | | | |

FIG. 21B
(a) READ PROCESSING
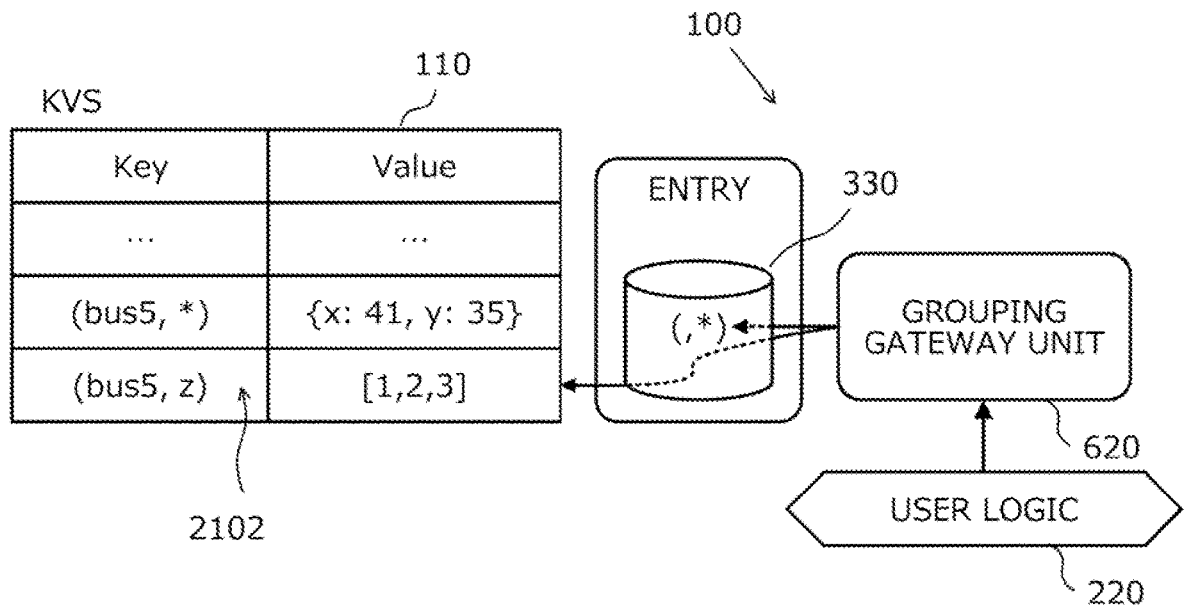
(b) WRITE PROCESSING
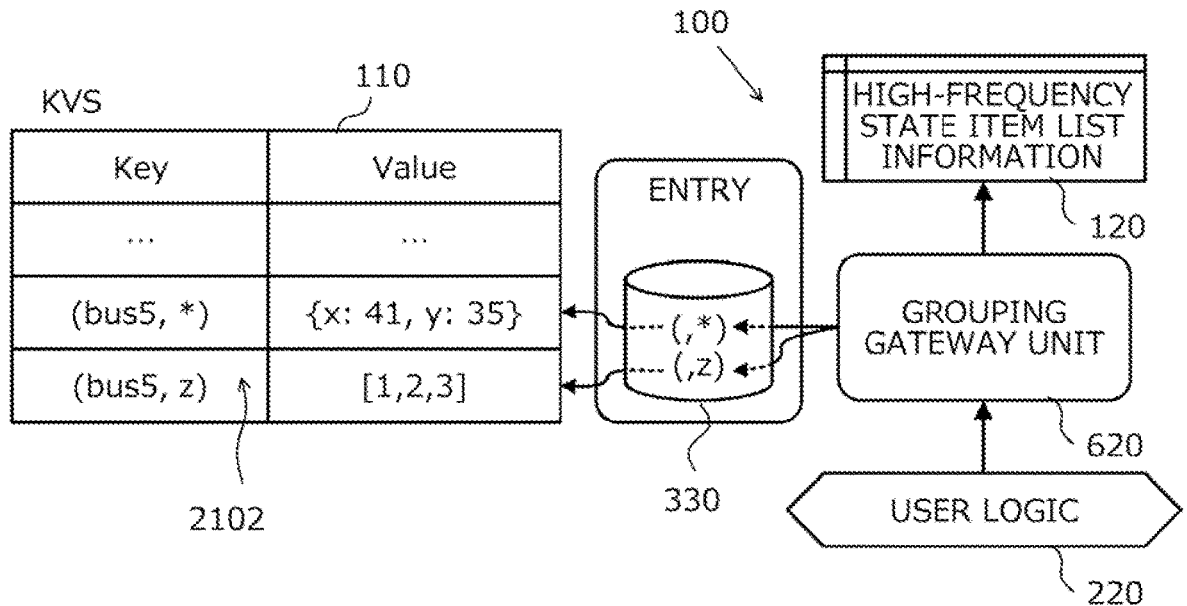

DATA MANAGEMENT METHOD FOR WRITING STATE INFORMATION IN DATA STORE AND COMPUTER-READABLE RECORDING MEDIUM STORING DATA MANAGEMENT PROGRAM FOR WRITING STATE INFORMATION IN DATA STORE

CROSS-REFERENCE TO RELATED APPLICATION

This application is based upon and claims the benefit of priority of the prior Japanese Patent Application No. 2022-5358, filed on Jan. 17, 2022, the entire contents of which are incorporated herein by reference.

FIELD

The embodiment discussed herein is related to a data management method and a computer-readable recording medium storing a data management program.

BACKGROUND

By a digital twin, a target object that is actually operating may be represented as a model in a virtual space. For example, an Internet of things (IoT) device in the real world such as a connected car or a smartphone, which is the target object, includes state information of a state (situation) such as a position or a speed of the IoT device in an event message and sends the event message to a data center. The data center constructs the digital twin of the target object (IoT device) in the real world from the state information included in the sent event message. The data center updates a state item in accordance with the sent event message, and a user logic associated with the update of the state item executes a processing program. In this manner, processing for each event is executed.

Japanese Laid-open Patent Publication No. 2007-328716, U.S. patent Ser. No. 10/210,087, and Japanese Laid-open Patent Publication No. 2019-133579 are disclosed as related art.

SUMMARY

According to an aspect of the embodiments, a data management method causes a computer to execute processing including: creating, when a predetermined data processing program performs data processing, based on an access frequency to a data store, high-frequency state item list information obtained by listing high-frequency state items of which the access frequency is high; determining, when state information that includes a value of the high-frequency state item is written to the data store, whether or not the state information corresponds to the high-frequency state item with reference to the high-frequency state item list information; grouping and writing pieces of the state information of a plurality of the high-frequency state item.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4A is an explanatory diagram of a storage example of pieces of state information of digital twins in accordance of the existing technique (part 1);

FIG. 4B is an explanatory diagram of a storage example of the pieces of state information of the digital twins in accordance with the existing technique (part 2);

FIGS. 10A and 10B are charts illustrating a management table for each type of digital twin in the data management apparatus;

FIGS. 12A, 12B, and 12C are charts illustrating an example of access statistical information for each type in the data management apparatus;

FIG. 21B is an explanatory diagram of read and write processing according to the embodiment;

DESCRIPTION OF EMBODIMENTS

Figure 1:
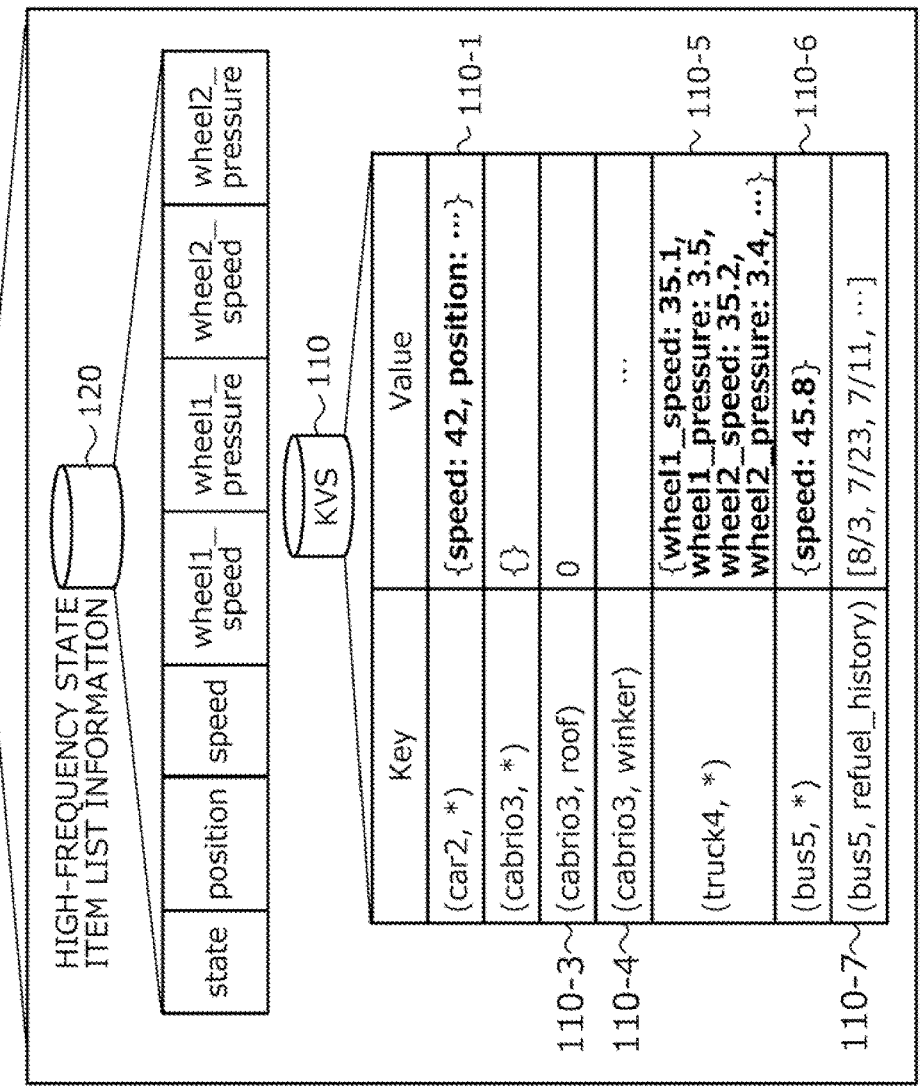
FIG. 1 is an explanatory diagram illustrating an example of a data management method according to an embodiment.

The IoT device sends an event message including state information to a data center when a state is updated or periodically. Since event messages are an infinite and unstopped event stream, the data center has to be able to receive a large number of event messages without stopping a system. For example, the data center performs data management of the received event messages in a data store such as an LSM-tree KVS. LSM-tree is an abbreviation for a log structured merge tree, and KVS is an abbreviation for a key value store. Since data read is slow but data write is fast, an LSM-tree KVS is suitable for state management of stream processing of the event messages in the digital twin.

As a first method for storing states of a digital twin in a data store in related art, there is a method for storing states as one entry for each state item of the digital twin. As a second method, there is a method for collecting all states as one entry for each digital twin.

As related art, for example, there is a technique in which stream data is narrowed down and acquired based on statistical information, and stream data characteristics are managed from schema definition. In the technique, a cache of relation data is determined based on a data rate, so that real-time processing is maintained and the amount of copies of external data is reduced. There is a technique for performing de-duplication in which only unique data is stored, reducing index operations in a cache when data is accessed by update of an entry of a cache index, and reducing the number of accesses to the cache index of a flush cache. There is a technique for updating a program without stopping a system by storing a type of an event and a plug-in in association with each other when a control message is received and by executing the plug-in corresponding to the type of the event when an event message is received.

In related art, since access to state data stored in a KVS occupies most of time spent for stream processing of event messages, processing performance of data processing may not be improved. In the first method for storing states in related art, when a large number of small state items are accessed, there is a problem that read waiting occurs each time and a processing time becomes long. In the second method, when there is a large state item having a low use frequency, this state item is read and written each time together with a state item having a high use frequency. Thus, there is a problem that cost of I/O or backup increases.

A digital twin is a system in which state storage in a data store is directly coupled to the real world. In the digital twin, an access pattern of the state dynamically changes due to a change occurring in the real world. Replacement of a processing logic for processing an event message is also dynamically executed without stopping. Thus, there is a constraint that a storage structure of the state may not be optimized in advance in the digital twin.

According to one aspect, an object of the present disclosure is to dynamically optimize a storage structure of a data store in accordance with state update, and to speed up access to the data store.

Hereinafter, an embodiment of a data management method and a data management program according to the present disclosure are described in detail with reference to the drawings.

Example of Data Management Method According to Embodiment

FIG. 1 is an explanatory diagram illustrating an example of the data management method according to the embodiment. For example, a data management apparatus 100 is a computer that performs processing of obtaining statistics of high-frequency state items having high access frequencies to a data store, grouping the high-frequency state items, and recording the grouped high-frequency state items as one entry in the data store. For example, the data store is a KVS 110 or a cache memory of the data management apparatus 100.

The data management apparatus 100 receives and processes an event message about state update transmitted from an IoT device, and updates state data of a digital twin. In the data management apparatus 100, a user logic corresponding to the updated state performs processing of executing a predetermined function (operation).

(a) of FIG. 1 illustrates an example of logical state structures of digital twins. (b) of FIG. 1 illustrates a storing layout of the KVS 110 serving as a data store of the data management apparatus 100 and a high-frequency state item list information 120.

A logical state structure of the digital twin illustrated in (a) of FIG. 1 theoretically indicates an event message for each IoT device outside the data management apparatus 100, and indicates a digital twin (DT) for each IoT device.

For example, each IoT device sends an event message including state information of a different state (situation) when a time elapses to the data management apparatus 100. For example, an IoT device (DT1) having an id "cart (vehicle 2)" transmits, as pieces of state information, a state "speed (speed) 42 (km/h)" and a state "position (position)" in a certain period.

The data management apparatus 100 according to the embodiment performs the following processing.

(1) The data management apparatus 100 collects data on an access frequency to the state item, performs predetermined statistical processing, and generates the high-frequency state item list information 120 of the state items that involve a highly frequent access to the data store. The high-frequency state item list information 120 is obtained by listing state items accessed with a high frequency in a table. For example, the access frequency to the state item may be obtained based on an access frequency of reading and writing from and to the KVS 110. In a case of the KVS 110 with a cache (cache memory), the access frequency to the state item may be obtained based on the access frequency of reading and writing from and to the cache.

For the sake of convenience, an example in which the data management apparatus 100 extracts, as the high-frequency state items, states of event messages having a high transmission frequency among event messages transmitted by the IoT devices (DT1 to DT4) will be described with reference to FIG. 1.

In the example of (b) of FIG. 1, the data management apparatus 100 includes position (position), speed (speed), and wheel1_speed (speed of a wheel 1), as the high-frequency state items of the high-frequency state item list information 120. The high-frequency state items of the high-frequency state item list information 120 include wheel1_pressure (air pressure of the wheel 1), wheel2_speed (speed of a wheel 2), and wheel2_pressure (air pressure of the wheel 2).

For example, the data management apparatus 100 determines, as the high-frequency state items, pieces of state information of event messages transmitted with a high frequency from the IoT devices (DT1 to DT4) in (a) of FIG. 1, and creates the high-frequency state item list information 120. The high-frequency state item list information 120 is allocated to a memory of the data management apparatus 100.

For example, items "position (position)" and "speed (speed)" of the high-frequency state item list information 120 illustrated in (b) of FIG. 1 are created based on state items H1 transmitted with a high frequency from an IoT device having an id "car2 (passenger car 2)" or the like. The high-frequency state item list information 120 includes items "wheel1_speed (speed of the wheel 1)", "wheel1_pressure (air pressure of the wheel 1)", "wheel2_speed (speed of the wheel 2)", and "wheel2_pressure (air pressure of the wheel 2)". For example, these items are created based on state items H2 transmitted with a high frequency from an IoT device having an id "truck4 (truck 4)" or the like.

The example in which the high-frequency state item list information 120 is created based on the id "car2 (passenger car 2)" and the id "truck4 (truck 4)" of specific IoT devices has been described above. State items H transmitted with a high frequency for each of "car" and "truck" which are different types (attributes) such as kinds of vehicles may be set as the high-frequency state items in the high-frequency state item list information 120. Regardless of the type of the IoT device, the state items H transmitted with a high frequency may be simply set as the high-frequency state items in the high-frequency state item list information 120.

The data management apparatus 100 optimizes the high-frequency state item list information 120 by dynamically changing a storage structure of the state items by periodic maintenance. In this manner, the data management apparatus 10 copes with a change in an access pattern to the state item.

(2) The data management apparatus 100 groups high-frequency state items accessed with a high frequency in a specific digital twin X with reference to the high-frequency state item list information 120. For example, the data management apparatus 100 collectively records the grouped states in one record in the KVS 110 as one entry (X, *). On the other hand, the data management apparatus 100 records another state item, for example, a low-frequency state item that is not frequently accessed in one record in the KVS 110 as an individual entry.

For example, among the logical state structure examples of the digital twins DT illustrated in (a) of FIG. 1, the state items H1 "speed: 42" and "position: . . . " of the id "car2" correspond to the high-frequency state items of the high-frequency state item list information 120 in (b) of FIG. 1. In this case, as illustrated in (b) of FIG. 1, the data management apparatus 100 sets a key (key) to (car2, *) as one entry (X, *) of the KVS 110. The data management apparatus 100 groups, as a value (value), the plurality of state items H1 {speed: 42, position: . . . } related to the speed and the position of car2 into one entry (one record) 110-1 of the KVS 110.

The state items H2 of the id "truck4" in (a) of FIG. 1 correspond to the high-frequency state items set in the high-frequency state item list information 120 in (b) of FIG. 1. The data management apparatus 100 sets the key to (truck4, *) as one entry (X, *) of the KVS 110. The data management apparatus 100 groups, as the value, the plurality of state items H2 related to the speed and the air pressures of truck4 into one entry (one record) 110-5 of the KVS 110.

The state items L1 "roof (roof): 0 (no roof)" and "winker (winker instruction direction): . . . " of an id "cabrio3" illustrated in (a) of FIG. 1 are low-frequency state items, and are not set in the high-frequency state item list information 120 in (b) of FIG. 1. In this case, as illustrated in (b) of FIG. 1, the data management apparatus 100 stores, as an individual entry, an entry 110-3 in which the key is (carbrio3, roof) and the value is {0} in the KVS 110. The data management apparatus 100 individually stores an entry 110-4 in which the key is (cabrio3, winker) and the value is { . . . }. As described above, when the low-frequency state items L1 include a plurality of states, the data management apparatus 100 creates an individual entry for each of the states.

Among pieces of state information of an id "bus5" in (a) of FIG. 1, the speed corresponds to a high-frequency state item H3 in (b) of FIG. 1. However, refuel_history (refueling history (date)) corresponds to a low-frequency state item L2, and is not set in the high-frequency state item list information 120 in (b) of FIG. 1. In this case, as illustrated in (b) of FIG. 1, the data management apparatus 100 stores, as one entry (X, *) of the KVS 110, the state item H3 in which the key is (bus5, *) and the value is the speed of bus5 in one entry (one record) 110-6 of the KVS 110. The data management apparatus 100 stores the low-frequency state item L2 in which the key is (bus5, refuel_history) and the value is the refueling history (date) in an individual entry 110-7 of the KVS 110.

When the data management apparatus 100 is configured to access the KVS 110 with a cache, a control unit (central processing unit (CPU)) of the data management apparatus 100 prefetches the high-frequency state item list information 120 to the cache at the beginning of event processing. Consequently, the data management apparatus 100 may read a plurality of state items accessed with a high frequency by one read access to the KVS 110.

(3) The data management apparatus 100 asynchronously executes the update of the high-frequency state item list information 120 when performing writing of the state item to the KVS 110 in response to a dynamic change in the high-frequency state item list information 120.

The high-frequency state item list information 120 is information determined by selecting the state item of the state information transmitted with a high frequency from the IoT device. The data management apparatus 100 performs processing of grouping and storing the state items in the KVS 110 or of storing the state items as individual entries in the KVS 100, with reference to the high-frequency state item list information 120. Consequently, the data management apparatus 100 may perform maintenance on the storage structure of the KVS 110 asynchronously with a write operation to the KVS 110 in best effort, and extra overhead for updating the storage structure of the KVS 110 does not occur.

(Overview of Digital Twin)

Figure 2:
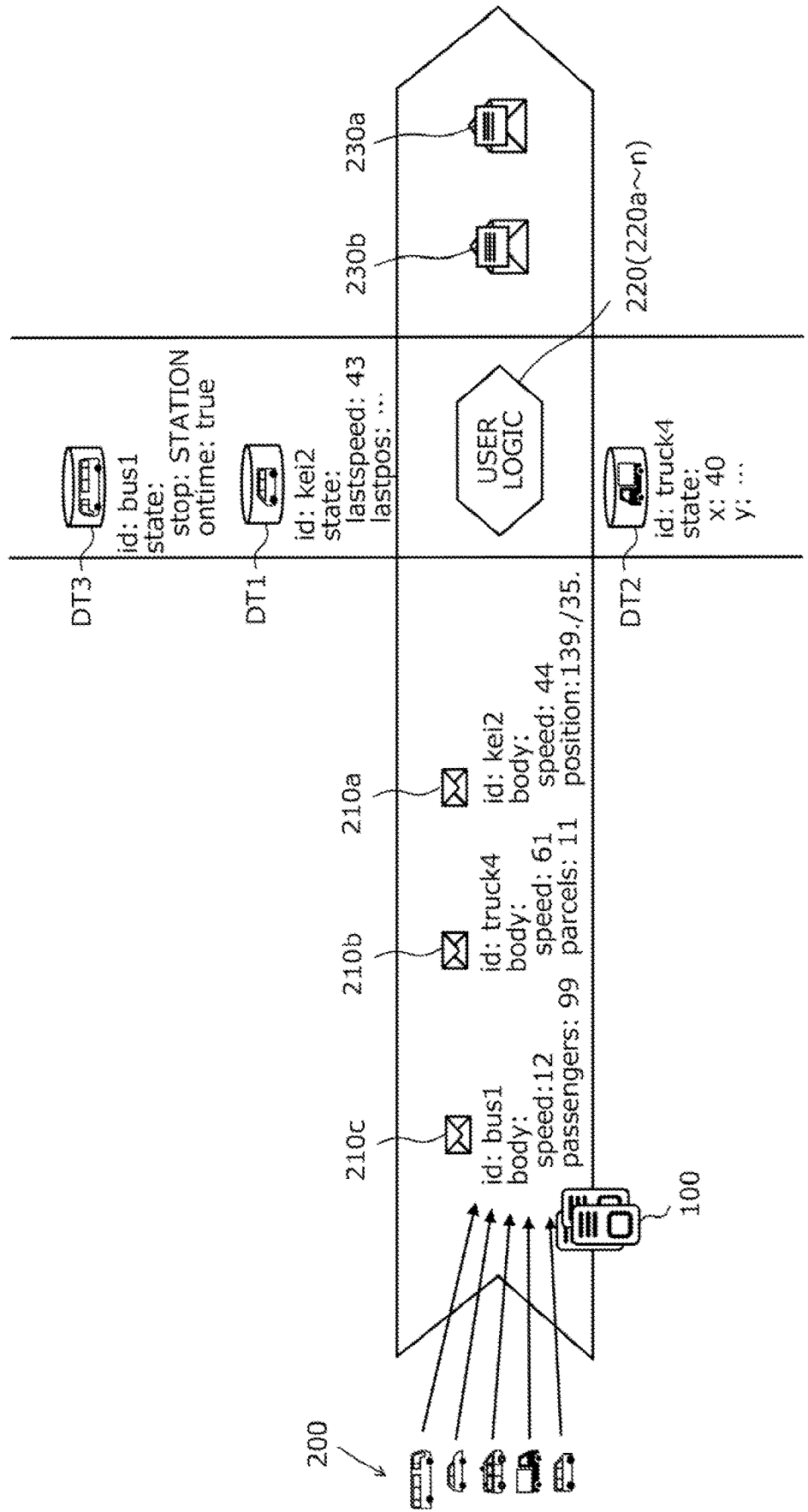
FIG. 2 is an explanatory diagram illustrating a processing overview of digital twins.

FIG. 2 is an explanatory diagram illustrating a processing overview of digital twins. An overview of data processing of the digital twins performed by the data management apparatus 100 will be described. IoT devices 200 in the real world transmit, as event messages, pieces of state information thereof to the data management apparatus 100 which is a sequential data center. The data center includes, for example, a server group and a cloud.

For example, the IoT devices 200 are connected cars, smartphones, or the like. In the example of FIG. 2, the IoT devices 200 are connected cars such as a bus and a truck. The IoT devices 200 transmit event messages 210 including pieces of state information each including an id for identification and a state to the data management apparatus 100.

A horizontal axis in FIG. 2 indicates a time. FIG. 2 illustrates a state where the IoT devices 200 transmit, as the event messages 210, the piece of state information to the data management apparatus 100. According to an order in which the event messages 210 arrive at the data management apparatus 100, first, the data management apparatus 100 receives an event message 210a of a light vehicle (id: kei2). Thereafter, the data management apparatus 100 receives an event message 210b of a truck (id: truck4) and then receives an event message 210c of a bus (id: bus1). State information included in each of the event messages 210a to 210c includes states such as a speed, a current position, the number of parcels, and the number of passengers set for a corresponding one of the IoT devices 200. For example, the IoT devices 200 transmit the event messages 210 in which the state is updated whenever the state is updated or periodically.

For example, since the data management apparatus 100 receives the event messages 210 in a stream form from a vast number of IoT devices 200 located in the entire country, the data management apparatus 100 is operated all the time without stopping the system. A vertical axis in FIG. 2 indicates digital twin DTs corresponding to the respective IoT devices 200.

For example, the data management apparatus 100 includes a plurality of user logics 220 (220a to 220n) for different types (attributes) of the IoT devices 200. Each of the user logics 220 is a predetermined data processing program operating on the data management apparatus 100, and updates a state of the digital twin DT based on the state information included in the event message 210 received from the IoT device 200. Each of the user logics 220 may execute a processing program for each application associated with the updated state item in advance, and may output logic processing information 230 that is a processing result.

For example, when the event message 210a of the light vehicle (id: kei2) is received, the data management apparatus 100 starts the user logic 220a corresponding to the attribute (light vehicle) of the state information, and updates states of a digital twin DT1. The user logic 220a may output logic processing information 230a corresponding to the update of states (speed, current position, and the like in the illustrated example) of the light vehicle. For example, based on the updated current states, the user logic 220a outputs optimum route information to a destination as the logic processing information 230a to a navigation function of guiding the light vehicle to travel.

When the event message 210b of the truck (id: truck4) is received, the data management apparatus 100 starts the user logic 220b corresponding to the attribute (truck), and updates states of a digital twin DT2. The user logic 220b may output logic processing information 230b corresponding to the update of the states (speed, the number of parcels, and the like in the illustrated example) of the truck. For example, the user logic 220b outputs information of the states for each update as the logic processing information 230b to an operation management function of managing an operation of the truck.

As illustrated in FIG. 2, the data management apparatus 100 constructs digital twins DT of target objects in the real world, based on the pieces of state information included in the event messages 210 received from the IoT devices 200. The digital twin DT corresponds to a model, of a physical facility (IoT device 200) actually operating in the real world, constructed in a virtual space. Whenever the event message 210 is received, the data management apparatus 100 updates the state information of the KVS 110 storing the information on the digital twin DT.

Data Management Configuration Example of Existing Technique

Figure 3:
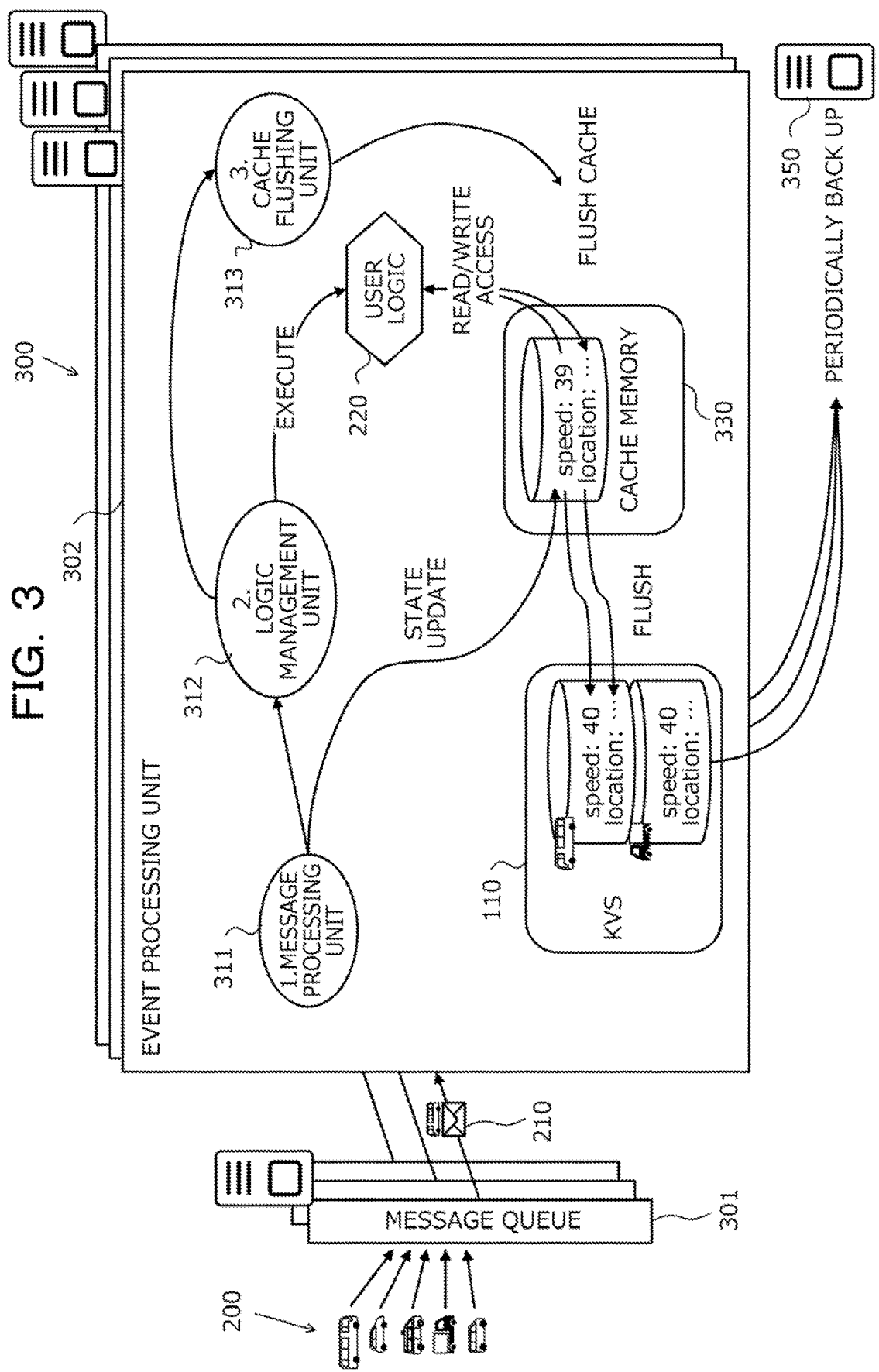
FIG. 3 is an explanatory diagram of a data management function of an existing technique.

FIG. 3 is an explanatory diagram of a data management function of an existing technique. As for the reference signs in FIG. 3, the same constituent elements as the constituent elements in the embodiment are denoted by the same reference numerals for the sake of convenience. A data management apparatus 300 arranged in a data center is constructed by, for example, distributed processing of a plurality of servers. The data management apparatus 300 illustrated in FIG. 3 roughly includes functional units of message queues 301 and functional units of event processing units 302.

The message queues 301 receive and process the event messages 210 transmitted by the IoT devices 200, and output the event messages 210 to the event processing units 302. The event processing units 302 include a plurality of processing threads (for example, a plurality of servers) that perform distributed processing on the event messages 210.

Each of the event processing units 302 includes a message processing unit 311, a logic management unit 312, a cache flushing unit 313, and the user logic 220, which are functional units, and includes a cache memory 330 and the KVS 110. The event processing unit 302 sequentially executes the following processing 1. to 3.

1. The message processing unit 311 reads an event message for an object belonging to a thread thereof from the message queue 301, and performs deserialization processing. The message processing unit 311 stores data of each state item, in which the state is updated, which is included in the event message, in the cache memory 330.

2. The logic management unit 312 calls the user logic 220 associated with the updated state item. The called user logic 220 executes processing of reading/writing state information from and to the cache memory 330 in the KVS 110, which is performed by the event processing unit 302.

3. When a write access is performed, the cache flushing unit 313 writes (flushes) the data of the state information recorded in the cache memory 330 to the KVS 110 for each entry, and then deletes the written data from the cache memory 330. The state information for each IoT device 200 for which stream processing is performed on the event message for each distributed node is retained in the KVS 110. The event processing unit 302 periodically backs up the data stored in the KVS 110 to a backup server 350 or the like.

Storage Example of State Information of Digital Twin in Accordance with Existing Technique FIGS. 4A and 4B are explanatory diagrams of storage examples of the pieces of state information of the digital twins in accordance with the existing technique. Examples of the logical state structures of the digital twins illustrated in (a) of FIG. 4A and (a) of FIG. 4B have the same contents as the contents illustrated in (a) of FIG. 1.

FIG. 4A illustrates a first method for storing the states of the digital twins. In the first method, individual state items of each digital twin DT are stored as individual entries of the KVS 110.

According to the first method, the state items of the digital twin may be individually accessed and rewritten in the KVS 110. For example, when pieces of update data of a plurality of state items included in the event messages transmitted from the IoT devices 200 are processed, only entries (records) used for the update may be accessed in the KVS 110.

However, the first method has a disadvantage that it is costly to find the entries in the KVS 110 at each access. For example, when there are many small entries as in an entry region E, the number of entries for each state becomes large, and whenever a large number of small state items are accessed, READ waiting occurs, a processing time becomes long, and the access cost to the KVS 110 becomes high.

FIG. 4B illustrates a second method for storing the states of the digital twins. In the second method, one KVS entry is created for each digital twin DT, and all state items of the corresponding digital twin are stored in the one KVS entry. According to the second method, for each of the event messages transmitted from the IoT devices 200, the KVS 110 is accessed only once.

However, the second method has a disadvantage that a large state item that is not frequently used becomes an I/O overhead. For example, a state value is not limited to a numeral or a character string but may become large due to complicated contents such as a list structure, and even the state value that becomes large is similarly subjected to input/output (I/O) in the KVS 110. For example, when there is a large state item with a low use frequency, since the large state item is read and written every time together with a state item with a high use frequency, costs of I/O and backup increase. In the example of FIG. 4B, a state of the id "bus5" of DT4 includes two state items "speed (speed)" and "refuel_history (refueling history (date)) F". The speed is updated with a high frequency, while the refueling history is updated with a low frequency. In the second method, since these two values (speed and refueling history) are set in one entry (key "bus5") of the KVS 110, the low-frequency state item (refueling history F) becomes overhead when I/O, for example, reading (READ) is performed in the KVS 110.

Since the KVS 110 may not partially update values written once because of characteristics thereof, processing of deleting and adding data again is performed in the update of the state. Thus, the cost becomes high in the second method. When processing of differential backup is applied to the KVS 110, all the plurality of states in units of entries are updated. Thus, the differential backup becomes meaningless.

The digital twin has a unique situation in which state storage in the KVS 110 is a "system directly coupled to the real world". For example, in the digital twin, an access pattern of a state dynamically changes due to a change occurring in the real world. The reception of the event message is not stopped, and the replacement of the user logic 220 corresponding to the event message has to be dynamically executed without stopping. Thus, the KVS 110 may not optimize the storage structure in advance.

Regarding the state storage in the KVS 110, since the above-described first and second methods each have problems, hybridization in which the first method and the second method are combined is considered.

Figure 5:
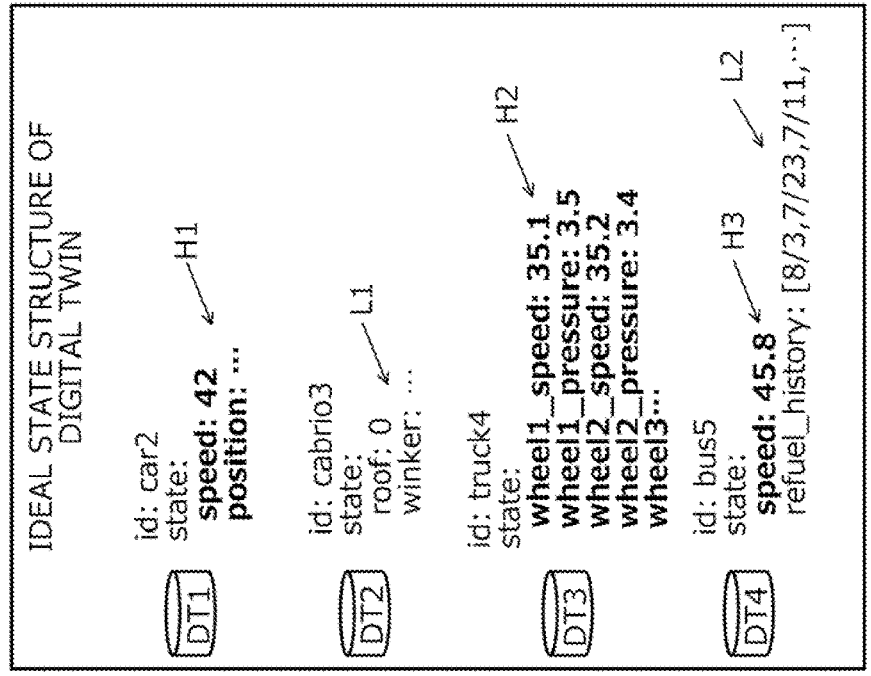
FIG. 5 is an explanatory diagram of another storage example of the pieces of state information of the digital twins.

FIG. 5 is an explanatory diagram of another storage example of the pieces of state information of the digital twins. FIG. 5 corresponds to a hybrid method in which the existing first and second methods are combined.

In a third method, the state items H1, H2, and H3 accessed with a high frequency in respective digital twins "X" are each grouped and stored in the KVS 110 with a special one entry of (X, *) (corresponding to the second method). The low-frequency state items L1 and L2 that are not frequently accessed are stored as individual entries in the KVS 110 (corresponding to the first method).

However, in the third method, which method of the first and second methods is to be selected for each state item may not be determined in advance. In terms of this, due to a change in the IoT device 200 occurring in the real world or addition and change of the user logic 220, the access pattern to the state in the KVS 110 dynamically changes. As described above, in the third method, in order to enable the dynamical determination of which method of the first and second methods is to be selected or the new addition of the state item, metadata G describing the storage structure in the KVS 110 is to be created and stored in the KVS 110. The metadata G in the example in FIG. 5 includes information on entry items (speed, position, speed of wheel, and the like) to which the first method is applied and information on entry items (presence or absence of a roof, winker instruction direction, refueling history, and the like) to which the second method is applied.

When the storage structure is dynamically changed in the third method, a change in the metadata and changes in the storage structures of all the related digital twins are to be collectively and exclusively processed. Thus, a large overhead occurs.

The data management method according to the embodiment solves the problems of the first method to the third method. In the embodiment, the following processing (1) to (3) is performed.

(1) The data management apparatus 100 collects data on the access frequency to each state item, performs predetermined statistical processing, and generates the state item (high-frequency state item list) information 120 accessed with a high frequency.

(2) The data management apparatus 100 groups the high-frequency state items accessed with a high frequency in the KVS 110 in a specific digital twin X, and stores the grouped states as one entry of (X, *) in the KVS 110 with reference to the high-frequency state item list information 120. On the other hand, the data management apparatus 100 stores other state items, for example, low-frequency state items that are not frequently accessed, as individual entries in the KVS 110.

(3) The data management apparatus 100 asynchronously executes the update of the high-frequency state item list information 120 when the state item is written to the KVS 110 in response to the dynamic change in the high-frequency state item list information 120.

The data management apparatus 100 prefetches the high-frequency state items accessed with a high frequency in the KVS 110, to the cache memory 330 at the beginning of the processing whenever the event message is processed. Since the data management apparatus 100 reads the high-frequency state items from the cache memory 330 in the second and subsequent access attempts to the KVS 110, the access to the KVS 110 does not occur. For example, for the high-frequency state items, even when the number of state items becomes large, the access to the KVS 110 may be performed once whenever the event message is processed. A waiting time of this single access may be reduced by prefetching the high-frequency state items to the cache memory 330 at the beginning of the processing.

Meanwhile, for the low-frequency state item that is not frequently accessed in the KVS 110, the data management apparatus 100 accesses the KVS 110 whenever the event message is processed. However, since the access frequency to the KVS 110 is low, the overall performance is not greatly affected. For example, since the low-frequency state item is not included in the entry that is collectively accessed in the KVS 110 like the high-frequency state items, unnecessary I/O or data transfer may be avoided.

As described above, the data management apparatus 100 performs access control to the KVS 110 on a frequency basis with reference to the high-frequency state item list information 120. Consequently, the data management apparatus 100 may shorten an access time to the information of the state stored in the KVS 110, and may speed up the event processing of the digital twin.

Since the data management apparatus 100 dynamically changes the storage structure of the state items, the metadata indicating the storage structure of the KVS 110 in real time is not used. During a normal write operation to the KVS 110, the data management apparatus 100 according to the embodiment asynchronously executes the update of the high-frequency state item list information 120. Consequently, in the data management apparatus 100, the access to the metadata as in the third method is no longer performed, and an extra overhead for maintenance such as the update of the storage structure of the KVS 110 does not occur.

For example, the state included in the high-frequency state item list information 120 is often updated in the digital twin when the event message from the IoT device 200 is received. Thus, the data management apparatus 100 simultaneously executes processing that is performed when the event message is received and processing of updating the high-frequency state item list information 120 for maintenance, and performs processing of writing a result of this simultaneously performed processing to the KVS 110 once for the KVS 110. Consequently, the occurrence of extra write processing in the KVS 110 for maintenance of the high-frequency state item list information 120 is avoided. Maintenance is performed to dynamically optimize the storage structure of the KVS 110 by updating the high-frequency state items set in the high-frequency state item list information 120 in response to a change in the high-frequency state items over time.

When the access pattern to the state item changes, the data management apparatus 100 changes the storage structure of the states in the KVS 110 in accordance with the change. Thus, the storage structure of the KVS 110 may be maintained to be optimum all the time. At this time, an additional access to the KVS 110 does not occur due to the change in the storage structure, and even though the storage structure of the state is changed, a delay in message processing or the like does not occur.

Functions of Data Management Apparatus
According to Embodiment

Figure 6:
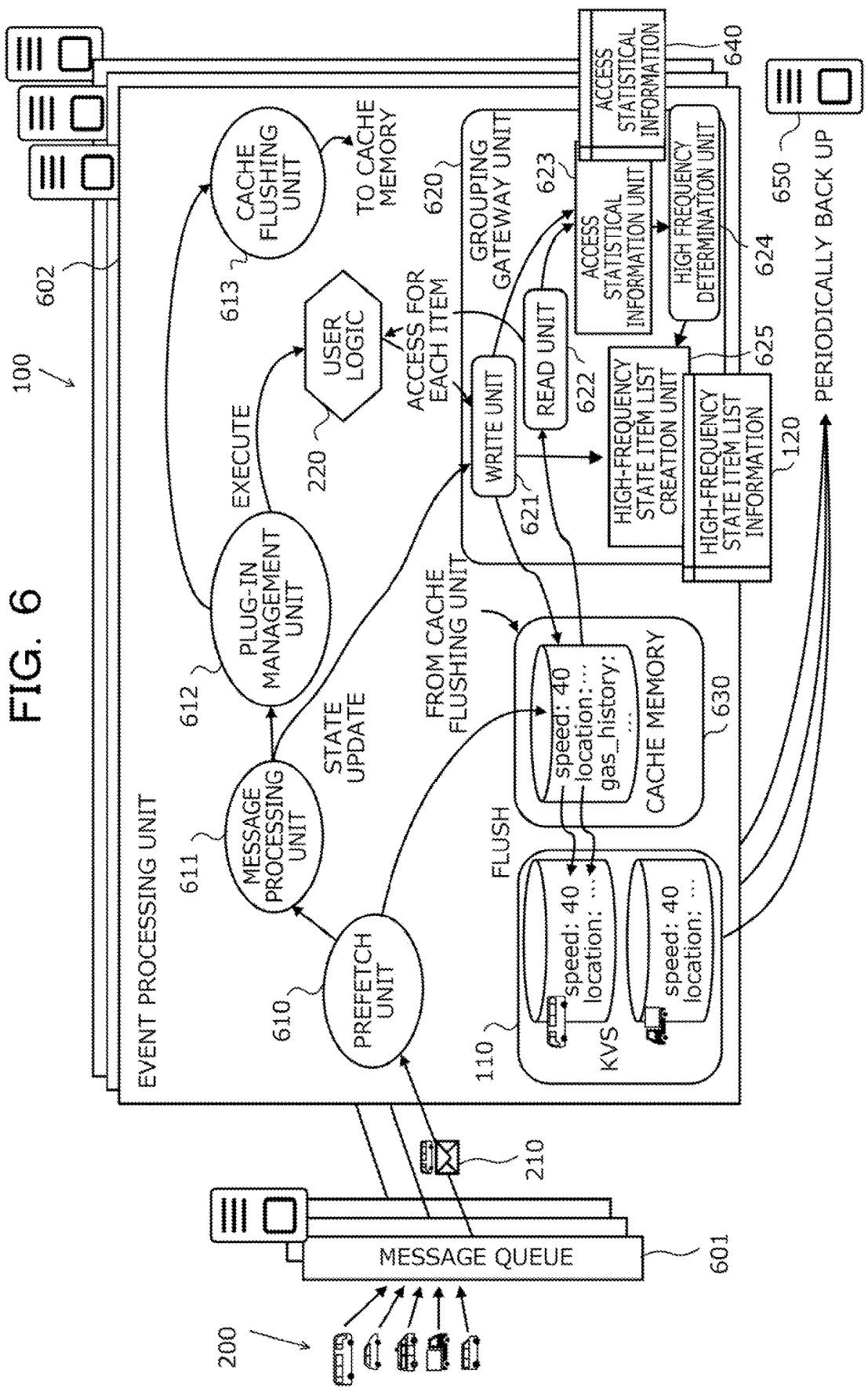
FIG. 6 is an explanatory diagram of functions of a data management apparatus according to the embodiment.

FIG. 6 is an explanatory diagram of functions of the data management apparatus according to the embodiment. The data management apparatus 100 arranged in the data center is constructed by, for example, distributed processing of a plurality of servers. The data management apparatus 100 illustrated in FIG. 6 roughly includes functional units of message queues 601 and functional units of event processing units 602.

The message queues 601 receive and process the event messages 210 transmitted by the IoT devices 200, and output the event messages 210 to the event processing units 602. The event processing units 602 include a plurality of processing threads (for example, a plurality of servers) that perform distributed processing on the event messages 210.

Each of the event processing units 602 includes a prefetch unit 610, a message processing unit 611, a plug-in management unit 612, a cache flushing unit 613, a grouping gateway unit 620, and the user logics 220, which are functional units, and a cache memory 630 and the KVS 110.

The prefetch unit 610 performs prefetching. For example, when there is the high-frequency state item list information 120, the prefetch unit 610 prefetches the high-frequency state item information 120 at the beginning of event message processing for an object belonging to the thread thereof. At this time, the prefetch unit 610 prefetches the entries (X, *) corresponding to the high-frequency state items from the KVS 110 to the cache memory 630.

The message processing unit 611 performs deserialization processing on the event message read from the message queue 601. The message processing unit 611 outputs data of each state item, in which the state is updated, which is included in the event message, to the grouping gateway unit 620.

The plug-in management unit 612 calls the user logic 220 associated with the updated state item. The called user logic 220 outputs information on the access (read/write) for each state item to the grouping gateway unit 620.

When the state information is written to the cache memory 630, the cache flushing unit 613 performs flushing processing of writing the data of this state information to the KVS 110 for each entry. Thereafter, the cache flushing unit 613 deletes the written data from the cache memory 630.

The grouping gateway unit 620 performs access control of reading and writing from and to the KVS 110. The grouping gateway unit 620 includes a write unit 621, a read unit 622, an access statistical information unit 623, a high frequency determination unit 624, and a high-frequency state item list creation unit 625.

The write unit 621 performs processing of writing the state information to the cache memory 630. The read unit 622 performs processing of reading the state information from the cache memory 630.

Based on the state update, the access statistical information unit 623 obtains predetermined access statistical information regarding the access frequencies related to the write unit 621 and the read unit 622, and outputs the access statistical information to the high frequency determination unit 624. For example, a statistical value of the access statistical information is an update frequency of the state item.

Based on the statistical value of the access statistical information, the high frequency determination unit 624 determines a high-frequency state item among the pieces of state information written by the write unit 621 by the state update. The high-frequency state item list creation unit 625 creates the high-frequency state item list information 120 obtained by listing the plurality of high-frequency state items with high frequencies determined by the high frequency determination unit 624. For example, the high-frequency state item list creation unit 625 periodically creates the high-frequency state item list information 120.

The grouping gateway unit 620 accesses the cache memory 630 with reference to the high-frequency state item list information 120 created by the high-frequency state item list creation unit 625. At this time, when the writing to the cache memory 630 is performed by the write unit 621, the grouping gateway unit 620 groups the plurality of high-frequency state items into one entry and sets the low-frequency state items as individual entries as described above.

Hereinafter, a write operation by the write unit 621 of the grouping gateway unit 620 and a read operation by the read unit 622 of the grouping gateway unit 620 will be described.

(Write Operation)

Figure 7:
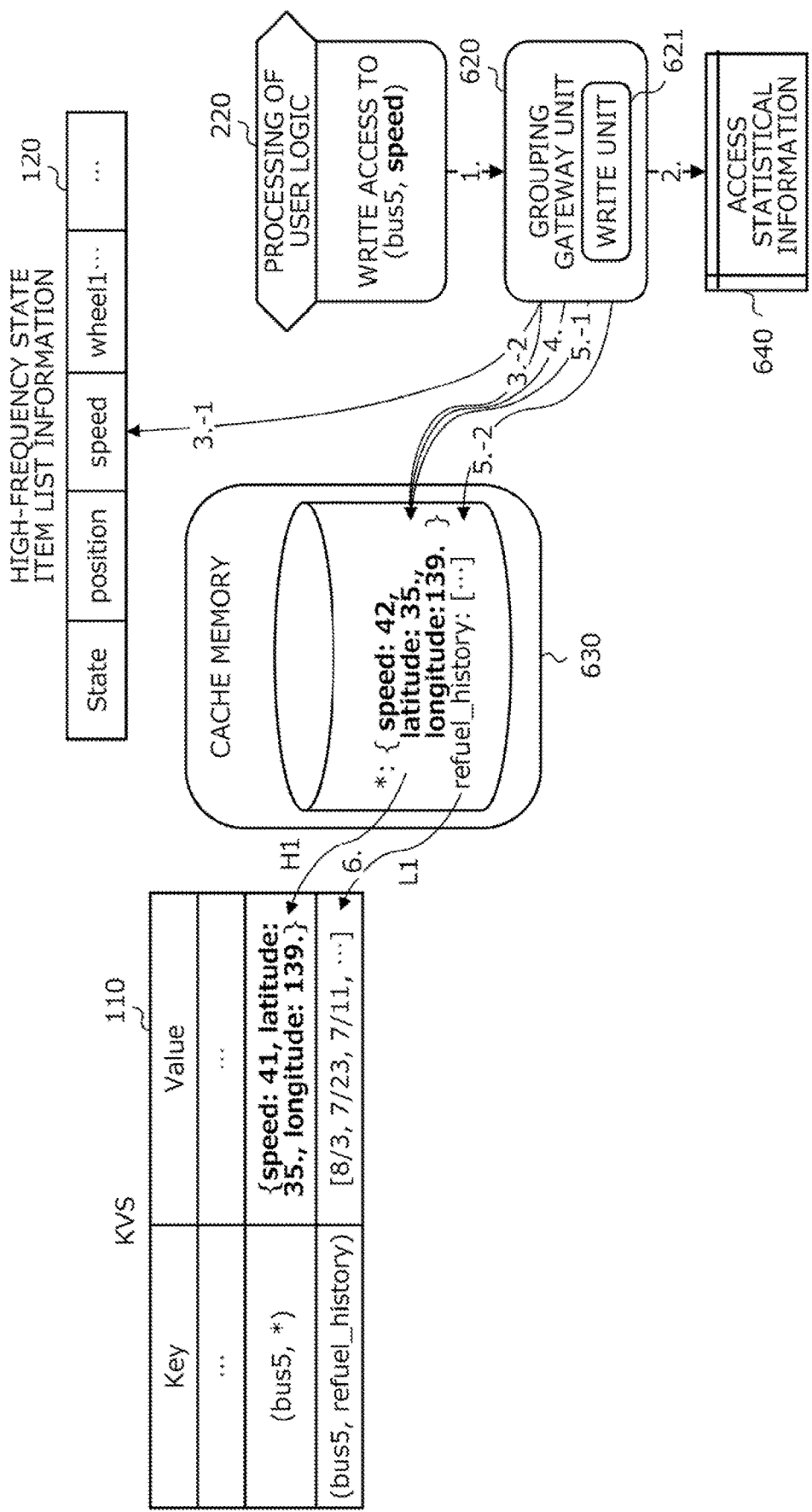
FIG. 7 is an explanatory diagram illustrating a processing example of a write operation by the data management apparatus.

FIG. 7 is an explanatory diagram illustrating a processing example of the write operation of the data management apparatus. FIG. 7 sequentially illustrates an operation example when the IoT device 200 performs a write operation of the state information (bus5, speed) of the speed for a bus.

As described above, in the data management apparatus 100, whenever an event message is received, the prefetch unit 610 prefetches the state item (bus5, *) included in the event message from the KVS 110 to the cache memory 630 at the beginning of the processing.

1. First, the user logic 220 performs a write access for the state item speed (update value is 42) to the grouping gateway unit 620.

2. The grouping gateway unit 620 records the access of the state item speed in the access statistical information 640 of the access statistical information unit 623.

3.1 The grouping gateway unit 620 checks, with the high frequency determination unit 624, whether or not the state item is the high-frequency state item. For example, when there is the high-frequency state item list information 120, the high frequency determination unit 624 checks whether or not the state item speed is included in the high-frequency state item list information 120. In some cases, there is no high-frequency state item list information 120 immediately after the data management apparatus 100 is started and restarted.

3.2 When there is no state item speed in the high-frequency state item list information 120, the grouping gateway unit 620 checks whether or not speed is included in the state items of the state information prefetched to the cache memory 630.

4. When there is speed in the high-frequency state item list information 120 or the cache memory 630, the grouping gateway unit 620 determines that speed is the high-frequency state item. In this case, the write unit 621 of the grouping gateway unit 620 updates a grouped state item of the cache memory 630 with a value "42" of the given state item speed.

5.1 On the other hand, when there is no speed in the high-frequency state item list information 120 or the cache memory 630, the grouping gateway unit 620 deletes the state item speed from the grouped state item in the cache memory 630. For example, when speed is recorded in the grouped state item in the cache memory 630, the state item speed that is no longer accessed with a high frequency is deleted. Thus, a change of the state items accessed with a high frequency is followed.

5.2 The grouping gateway unit 620 stores (bus5, speed) as a new individual entry in the cache memory 630. The grouping gateway unit 620 suspends writing to the KVS 110 until flushing control is performed.

6. Thereafter, the cache flushing unit 613 writes the high-frequency state items H1 grouped by the grouping gateway unit 620 and the low-frequency state item L1 as the individual entry to the KVS 110.

The data management apparatus 100 performs an operation when a write operation is performed on another state information, for example, (bus5, latitude) in the similar procedure to in 1. to 6. described above. Even when any number of high-frequency state items H1 included in the state item (bus5 and *) are accessed, the data management apparatus 100 executes one prefetching and one flushing for each access to the KVS 110.

When a write access to the low-frequency state item L1 (bus5, refuel_history) from the user logic 220 is performed, the data management apparatus 100 executes the following processing. After it is checked that the state item (bus5, refuel_history) is not the high-frequency state item, the grouping gateway unit 620 refers to the grouped state item (bus5, *) of the cache memory 630. The grouping gateway unit 620 checks that refuel_history is not included in (bus5, *). Since there is a possibility that the high-frequency state item list information 120 is changed immediately before and (bus5, *) is not updated, the grouping gateway unit 620 performs the checking. When refuel_history is included in (bus5, *), the grouping gateway unit 620 does not perform the writing of (bus5, refuel_history) this time. When refuel_history is not included in (bus5, *), the grouping gateway unit 620 stores (bus5, refuel_history) in the cache memory 630.

By the above-described write operation, the data management apparatus 100 may operate for a certain time even though there is no high-frequency state item list information 120. The high-frequency state item list information 120 may not be nonvolatile for fault tolerance. For example, when the data management apparatus 100 is started or is restarted after recovery, (X,*) is only empty until statistics are obtained, and the data management apparatus 100 may operate normally. Whenever the event message is processed, the data management apparatus 100 may not access the KVS 110 to update the high-frequency state item list information 120 and to change the high-frequency state item list information 120. The event processing unit 602 periodically backs up the data stored in the KVS 110 to a backup server 650 or the like.

(Read Operation)

Figure 8:
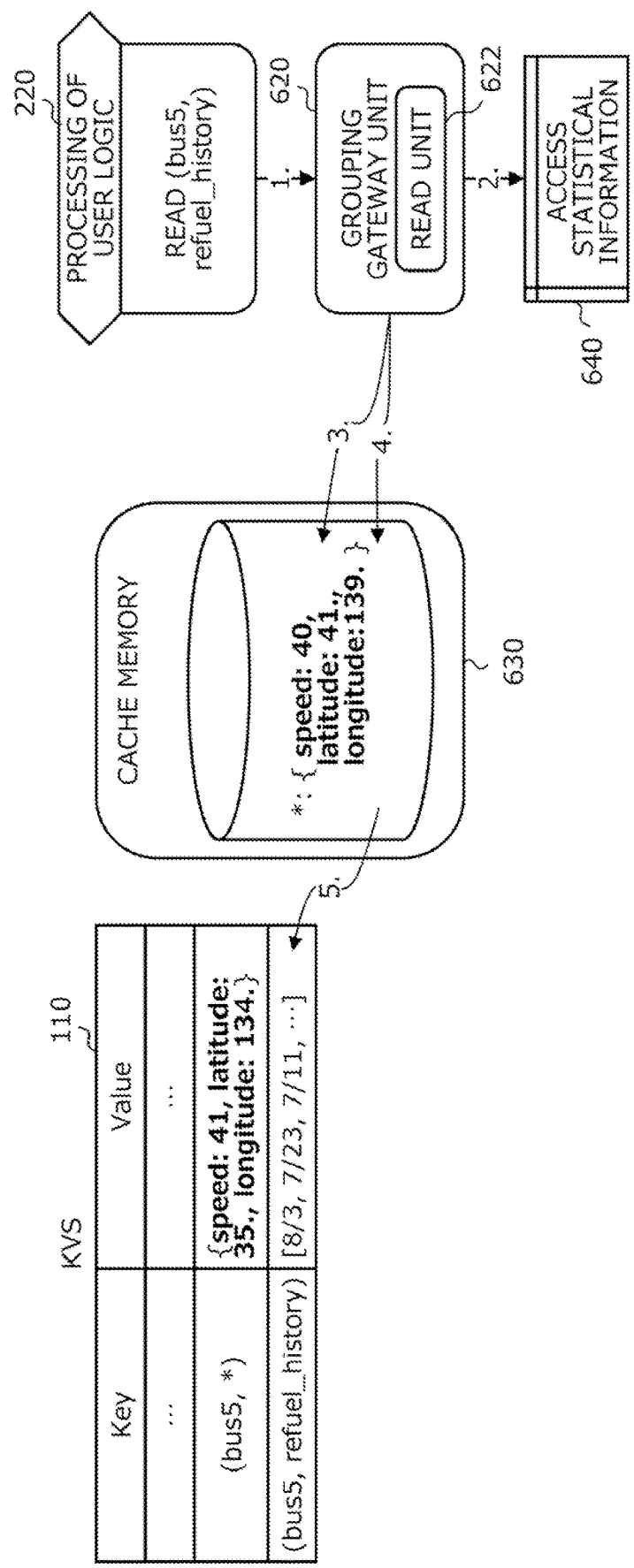
FIG. 8 is an explanatory diagram illustrating a processing example of a read operation by the data management apparatus.

FIG. 8 is an explanatory diagram illustrating a processing example of a read operation of the data management apparatus. FIG. 8 sequentially illustrates an operation example when the IoT device 200 performs a read operation of the state information (bus5, refuel_history) of the refueling history for the bus.

1. First, the user logic 220 performs a read access of the state item refuel_history to the grouping gateway unit 620.

2. The grouping gateway unit 620 records the access of the state item refuel_history in the access statistical information 640 of the access statistical information unit 623.

3. The grouping gateway unit 620 refers to the grouped state item (bus5, *) in the cache memory 630. When the state item refuel_history is found in the cache memory 630, the data management apparatus 100 completes the processing. Meanwhile, when refuel_history is not found, the data management apparatus 100 executes processing of 4.

4. The read unit 622 of the grouping gateway unit 620 reads the state information (bus5, refuel_history) from the cache memory 630. When refuel_history is not found, the data management apparatus 100 executes processing of 5.

5. The user logic 220 reads the state information (bus5, refuel_history) from the KVS 110. At this time, the user logic 220 also stores the read state information (bus5, refuel_history) in the cache memory 630.

In the case of the above-described read, the data management apparatus 100 may not access the high-frequency state item list information 120, and may correctly read the state information even though there is no corresponding state item in the high-frequency state item list information 120. Even though the storing layout of the state information set in the high-frequency state item list information 120 does not coincide with the storing layout of the state information in the KVS 110, the data management apparatus 100 may read the corresponding state information.

Determination Processing Example of
High-Frequency State Item List Information

Figure 9A:
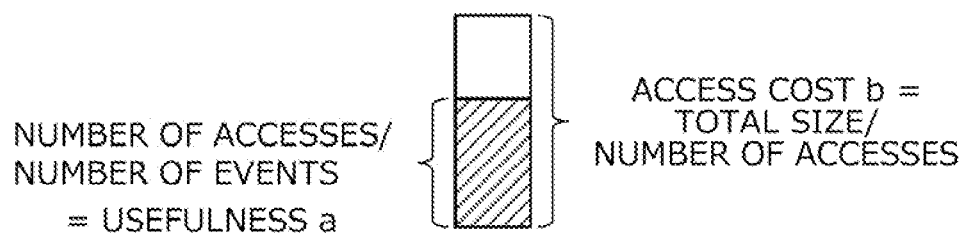
FIGS. 9A and 9B are explanatory diagrams illustrating a determination processing example of a high-frequency state item by the data management apparatus.
Figure 9B:
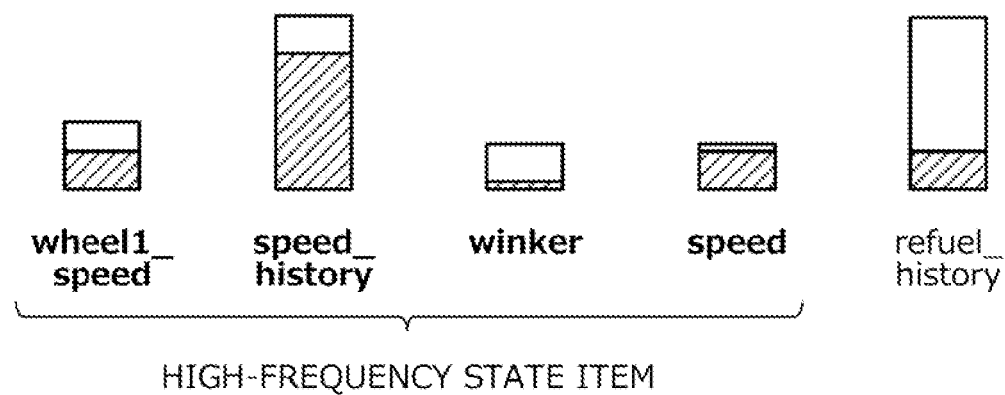

FIGS. 9A and 9B are explanatory diagrams illustrating a determination processing example of the high-frequency state item performed by the data management apparatus. A determination example of the high-frequency state item list information 120 by the high frequency determination unit 624 of the data management apparatus 100 will be described.

As information to be collected for determining the high-frequency state item, the high frequency determination unit 624 collects information such as the number of events processed by the data management apparatus 100, the number of accesses for each state item, and a total size of write (written) data. Based on these pieces of collected information, the high frequency determination unit 624 calculates usefulness and access cost of the state.

The high frequency determination unit 624 calculates usefulness a of the state by dividing the number of accesses by the number of events. Access cost b is calculated by dividing the total size of data by the number of accesses. The entire square (region) illustrated in FIG. 9A indicates access cost of one state, and a hatched region indicates usefulness.

For example, the high frequency determination unit 624 determines the high-frequency state item based on the following matters. In the example in FIG. 9B, the high frequency determination unit 624 determines, as the high-frequency state item, a state item in which a ratio of the usefulness a (hatched region) to the access cost b (entire region) of one state is larger than a preset threshold value and the number of included state items is maximized.

In the example in FIG. 9B, the high frequency determination unit 624 determines that four state items (wheel1_speeed to speed) on a left side are the high-frequency state items and one state item (refuel_history) on a right side is not the high-frequency state item. For example, the high frequency determination unit 624 determines, as the high-frequency state items, the state item speed_history of which both the access cost b and the usefulness a are large and the state item winker of which the access cost b and the usefulness a are small. By contrast, the high frequency determination unit 624 does not determine, as the high-frequency state item, the state item refuel_history of which the access cost b is large but the usefulness a is small. Whenever write processing is executed, the high frequency determination unit 624 changes and determines the high-frequency state item of the high-frequency state item list information 120.

Processing Example for Each Type of Digital Twin

In order to avoid an increase in the amount of statistical data, the data management apparatus 100 may divide the digital twins by types and may have one piece of high-frequency state item list information 120 for each type. The type corresponds to a kind or an attribute of the IoT device 200.

FIGS. 10A and 10B are charts illustrating a management table for each type of the digital twin of the data management apparatus. The data management apparatus 100 executes the different user logic 220 for each type such as a kind and an attribute of the IoT device 200. The data management apparatus 100 divides the digital twins by types, and has the high-frequency state item list information 120 for each type.

FIG. 10A illustrates a relationship management table 1001 of the digital twin and the type. A type name is set for each id of the digital twin in each record of the relationship management table 1001 of the digital twin and the type. For example, a type name "car" is set for an id "cart" of the digital twin, and a type name "bus" is set for an id "bus5" of the digital twin. An id of the digital twin corresponds to an id of the state information included in the event message received by the data management apparatus 100.

FIG. 10B illustrates a management table 1002 of the type name and the user logic to be executed. The user logic to be executed for each type name is set in each record of the management table 1002 of the type name and the user logic to be executed. For example, a user logic to be executed "user logic 1" is set for a type "car", and a user logic to be executed "user logic 2" is set for a type "bus".

The data management apparatus 100 retains the management tables 1001 and 1002 illustrated in FIGS. 10A and 10B in a memory or the like. When the event message is received, the data management apparatus 100 determines the type name corresponding to the digital twin id with reference to FIG. 10A based on the id of the state information included in the event message. Next, the data management apparatus 100 determines the user logic to be executed, which corresponds to the type name with reference to FIG. 10B. Consequently, the data management apparatus 100 may execute the user logic 220 for each type.

Figure 11:
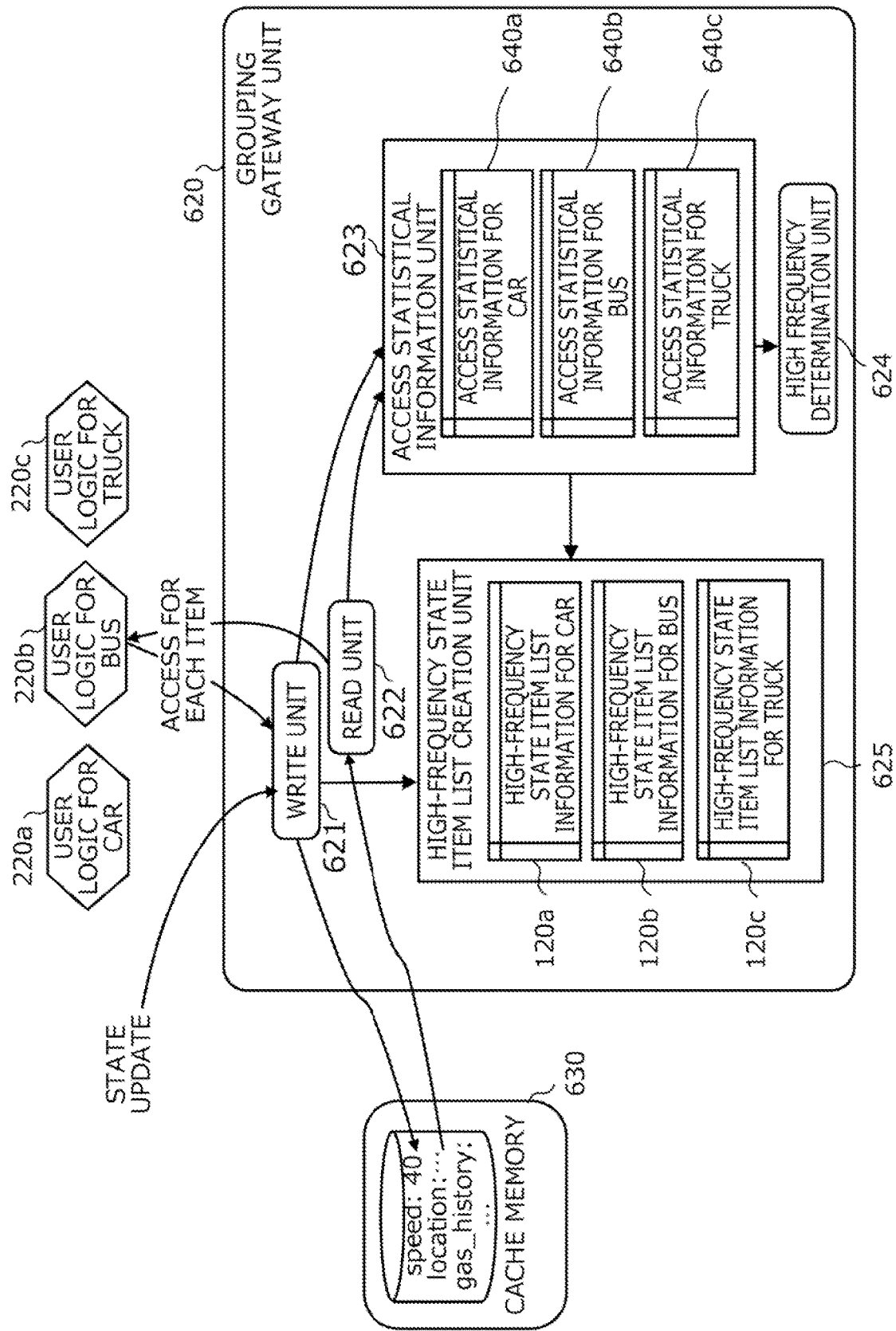
FIG. 11 is an explanatory diagram of user logic selection for each type by the data management apparatus.

FIG. 11 is an explanatory diagram of selection of the user logic for each type of the data management apparatus. In the example illustrated in FIG. 11, the user logics include a user logic 220a for car, a user logic 220b for bus, and a user logic 220c for truck so as to correspond to three user logics 220 for each type.

To correspond to the user logics 220 of the respective types, the grouping gateway unit 620 has the access statistical information 640 and the state item list information 120 for each of these types. The access statistical information unit 623 of the grouping gateway unit 620 creates access statistical information 640a for car, access statistical information 640b for bus, and access statistical information 640c for truck. The high-frequency state item list creation unit 625 of the grouping gateway unit 620 creates high-frequency state item list information 120a for car, high-frequency state item list information 120b for bus, and high-frequency state item list information 120c for truck.

When the event message is received, the data management apparatus 100 executes the user logic 220 (220a to 220c) corresponding to the type corresponding to the processing of the event message with reference to the management tables 1001 and 1002 in FIGS. 10A and 10B. The data management apparatus 100 selects the access statistical information 640 (640a to 640c) and the high-frequency state item list information 120 (120a to 120c) that correspond to the user logic 220 (220a to 220c) of the type to be executed. The grouping gateway unit 620 of the data management apparatus 100 performs the write and read accesses by using the pieces of access statistical information 640a to 640c and the pieces of high-frequency state item list information 120a to 120c that correspond to the user logics 220a to 220c for respective types.

With the above-described configuration, the data management apparatus 100 may execute the different user logic 220 for each type such as the kind and the attribute of the digital twin. Since the data amount of statistical data (the access statistical information 640 and the high-frequency state item list information 120) is divided by types in the processing of the event message, one piece of statistical information becoming a vast amount may be avoided and the statistical information may be easily managed.

Example of Statistical Information Managed by Data Management Apparatus

FIGS. 12A, 12B, and 12C are charts illustrating an example of access statistical information for each type in the data management apparatus. For the respective types described in FIG. 11, the access statistical information unit 623 creates access statistical information 640a for car illustrated in FIG. 12A, access statistical information 640b for bus illustrated in FIG. 12B, and access statistical information 640c for truck illustrated in FIG. 12C.

For example, the content of the access statistical information 640a for car is described. The access statistical information unit 623 sets values of respective items such as a first detection index, a last detection index, the number of accesses, and a total size, for each state item. The access statistical information unit 623 sets an event index. The event index is the number of event messages processed by the data management apparatus 100.

The first detection index and the last detection index are storage regions of the message queue 601 when the event processing unit 602 reads one event message from the message queue 601. Whenever the event is processed, the access statistical information unit 623 checks the last detection index. The access statistical information unit 623 calculates the number of events based on values of the first detection index and the event index. The access statistical information unit 623 calculates an access frequency based on the values of the first detection index and the last detection index and the number of accesses.

Figure 13A:
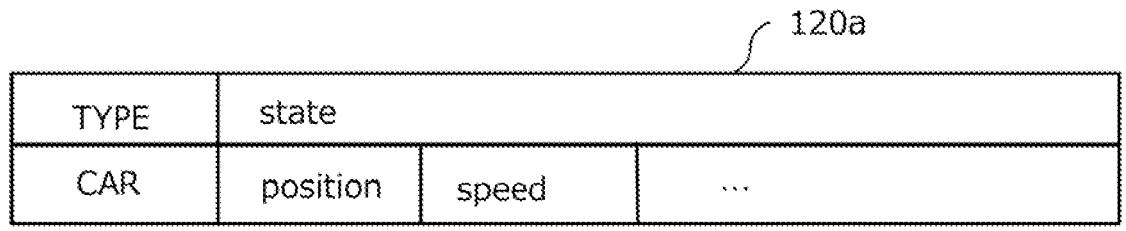
FIGS. 13A, 13B, and 13C are charts illustrating an example of high-frequency state item list information for each type managed by the data management apparatus.
Figure 13B:
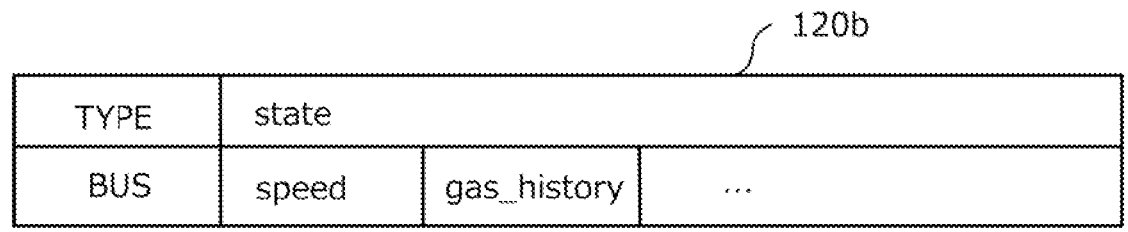
Figure 13C:
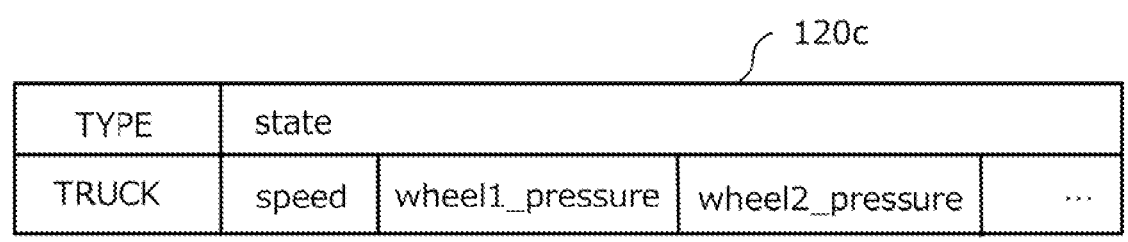

FIGS. 13A, 13B, and 13C are charts illustrating an example of high-frequency state item list information for each type managed by the data management apparatus. For the respective types illustrated in FIG. 11, the high-frequency state item list creation unit 625 creates high-frequency state item list information 120a for car in FIG. 13A, high-frequency state item list information 120b for bus in FIG. 13B, and high-frequency state item list information 120c for truck in FIG. 13C.

For example, the content of the high-frequency state item list information 120a for car is described. The high-frequency state item list creation unit 625 sets the car as the type, and sets position (current position) and speed (speed) values as the state items.

Hardware Configuration Example of Data Management Apparatus

Figure 14:
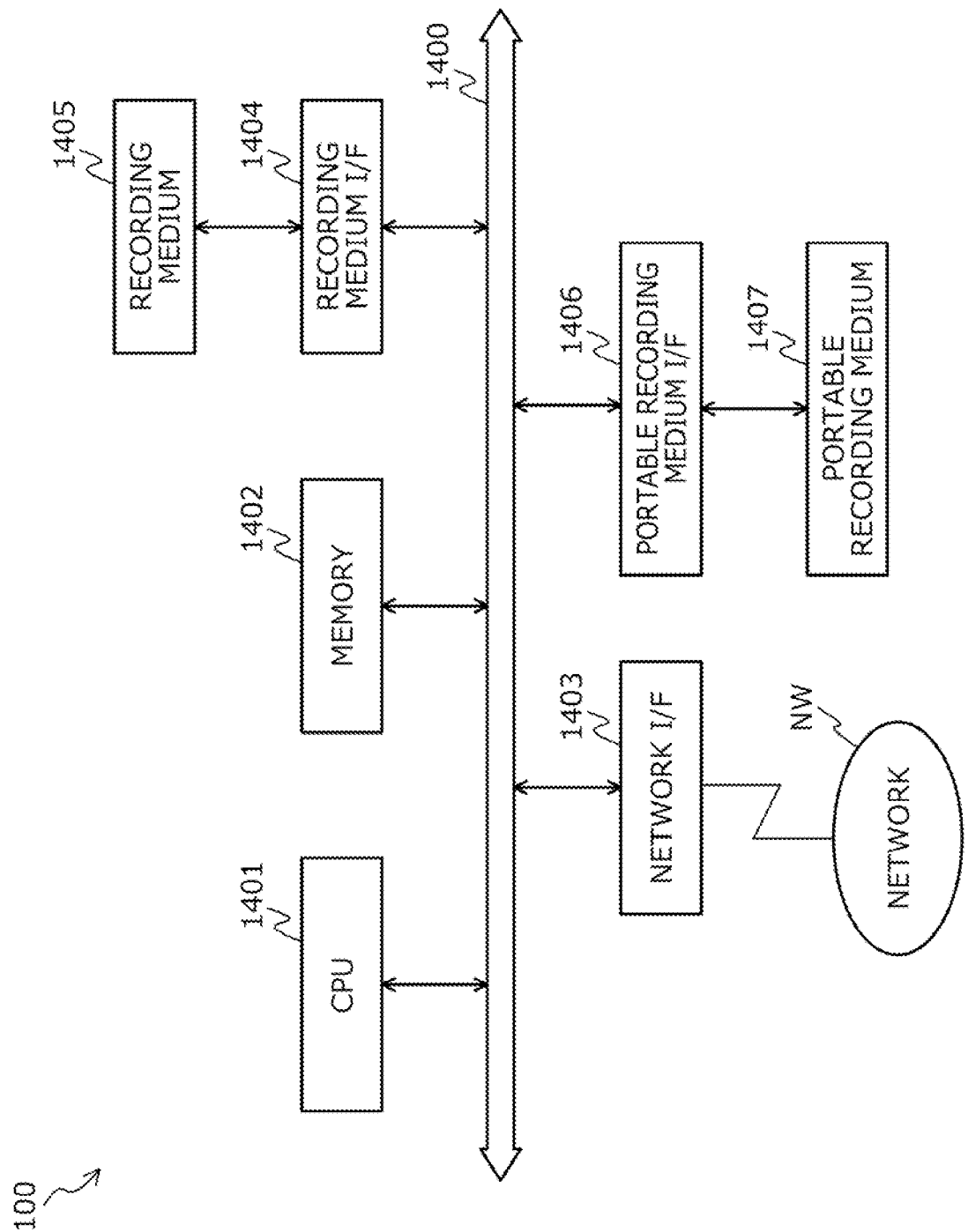
FIG. 14 is a diagram illustrating a hardware configuration example of the data management apparatus.

FIG. 14 is a diagram illustrating a hardware configuration example of the data management apparatus. The data management apparatus 100 may be constructed by a computer such as a server including general-purpose hardware illustrated in FIG. 14.

The data management apparatus 100 includes a CPU 1401, a memory 1402, and a network interface (I/F) 1403. The data management apparatus 100 includes a recording medium I/F 1404, a recording medium 1405, a portable recording medium I/F 1406, and a portable recording medium 1407. The CPU 1401, the memory 1402, the network I/F 1403, the recording medium I/F 1404, and the portable recording medium I/F 1406 are coupled to each other through a bus 1400.

The CPU 1401 functions as a control unit that controls the entire data management apparatus 100. The CPU 1401 may include a plurality of cores. The memory 1402 includes, for example, a read-only memory (ROM), a random-access memory (RAM), a flash ROM, and the like. For example, the flash ROM stores a program of an operating system (OS), the ROM stores application programs, and the RAM is used as a work area for the CPU 1401. Each of the programs stored in the memory 1402 causes the CPU 1401 to execute coded processing by being loaded to the CPU 1401.

The network I/F 1403 is coupled to a network NW through a communication line and is coupled to an external computer through the network NW. For example, when the data management apparatus 100 includes a plurality of servers 301, 302, and 350 as illustrated in FIG. 3, the servers 301, 302, and 350 are coupled to the external computer via the network NW. The network I/F 1403 serves as an interface between the network NW and the inside of the apparatus, and controls input and output of data from and to the external computer. As the network I/F 1403, for example, a modem, a LAN adapter, or the like may be adopted.

The recording medium I/F 1404 controls reading and writing of data from and to the recording medium 1405 under the control of the CPU 1401. The recording medium 1405 stores the data written under the control of the recording medium I/F 1404. Examples of the recording medium 1405 include a magnetic disk, an optical disc, and the like.

The portable recording medium I/F 1406 controls reading and writing of data from and to the portable recording medium 1407 under the control of the CPU 1401. The portable recording medium 1407 stores the data written under the control of the portable recording medium I/F 1406. Examples of the portable recording medium 1407 include a compact disc (CD)-ROM, a Digital Versatile Disk (DVD), a Universal Serial Bus (USB) memory, and the like.

The data management apparatus 100 may include, for example, an input device, a display, and the like in addition to the above-described constituent elements.

A function of the event processing unit 602 illustrated in FIG. 6 may be realized by the CPU 1401 illustrated in FIG. 14 executing a program. A function of the cache memory 630 illustrated in FIG. 6 may be realized by using, for example, the memory 1402 illustrated in FIG. 14. For example, a function of the KVS 110 illustrated in FIG. 6 may be realized by using the recording medium 1405 and the portable recording medium 1407 illustrated in FIG. 14. For example, the access statistical information 640 and the high-frequency state item list information 120 illustrated in FIG. 6 may be provided in recording regions of the memory 1402, the recording medium 1405, and the portable recording medium 1407 illustrated in FIG. 14.

Processing Example of Data Management Apparatus

Next, a processing example of the data management apparatus 100 will be described using FIGS. 15 to 20. The processing illustrated in FIGS. 15 to 20 is executed by the CPU 1401 that is the control unit of the data management apparatus 100.

Entire Processing Example

Figure 15:
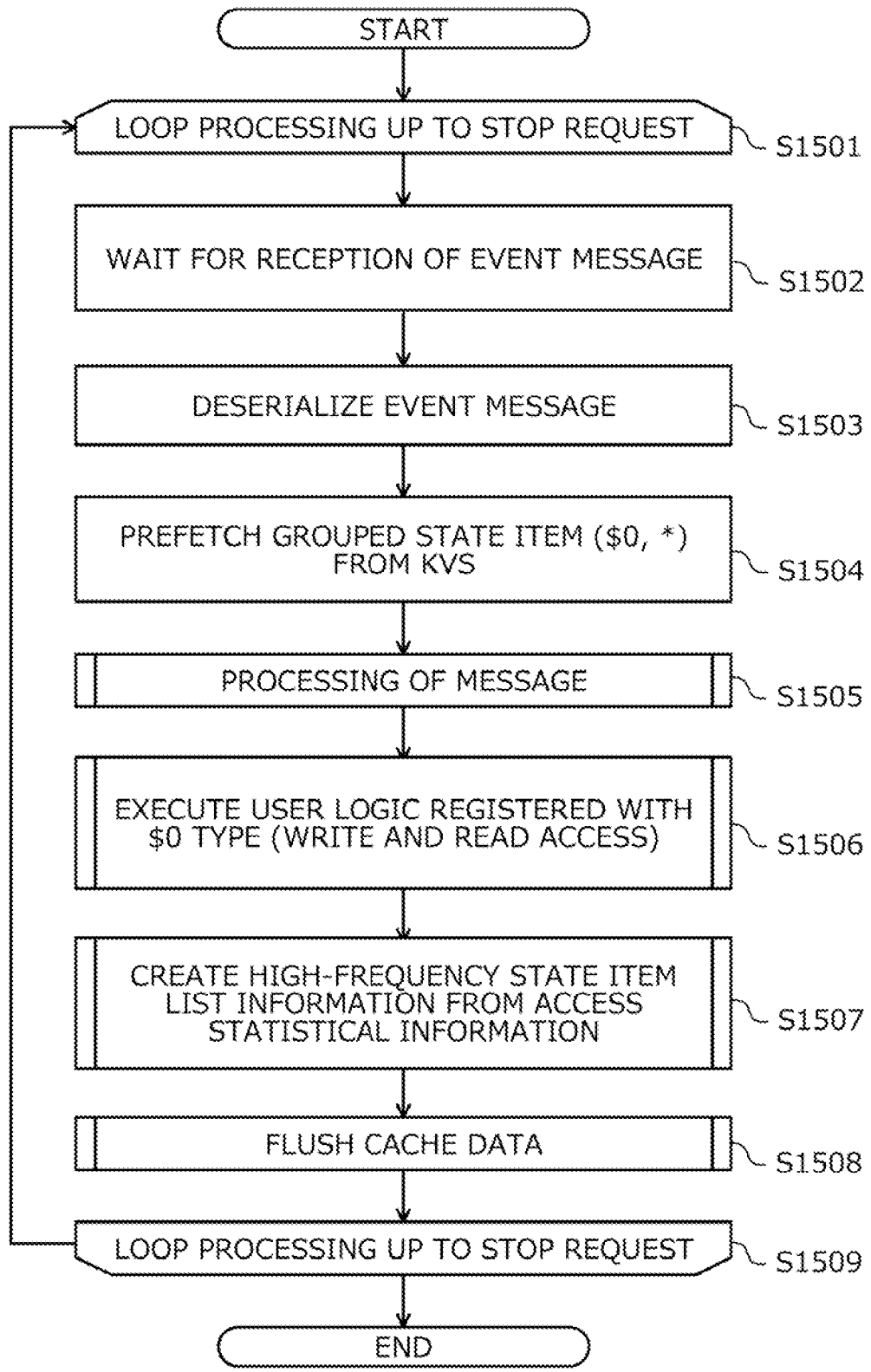
FIG. 15 is a flowchart illustrating an entire processing example of an event performed by the data management apparatus.

FIG. 15 is a flowchart illustrating the entire processing example of an event performed by the data management apparatus. For each processing (step S1502 to step S1508) illustrated in FIG. 15, the data management apparatus 100 continuously performs loop processing until there is a request to stop the processing.

First, the data management apparatus 100 waits for reception of an event message (step S1502). The process proceeds to processing in step S1503 in response to reception of an event message. When the event message is received, the data management apparatus 100 sets the id of the digital twin corresponding to the destination of the message in an object $0 which is the type of the digital twin.

Next, the data management apparatus 100 deserializes the received event message (step S1503). Next, the data management apparatus 100 prefetches, from the KVS 110, the grouped state item ($0, *) among the state items included in the received event message (step S1504).

Next, the data management apparatus 100 performs message processing on the received event message (step S1505). Next, the data management apparatus 100 selects the user logic 220 registered with the type of $0, and executes the processing of the selected user logic 220 (step S1506). The selected user logic 220 executes processing of the write access or the read access on the event message.

Next, the data management apparatus 100 creates the high-frequency state item list information 120 from the access statistical information 640 (step S1507). For example, the data management apparatus 100 periodically executes the creation of the high-frequency state item list information 120 for each predetermined period instead of whenever each event message is processed. Thereafter, the data management apparatus 100 flushes cache data of the cache memory 630 to the KVS 110 and updates the KVS 110 (step S1508). Thereafter, in step S1509, the process returns to the processing in step S1501 to continue the above-described processing when there is no request to stop for the data management apparatus 100, and the data management apparatus 100 ends the above-described processing when there is a request to stop the processing (step S1509).

Message Processing Example

Figure 16:
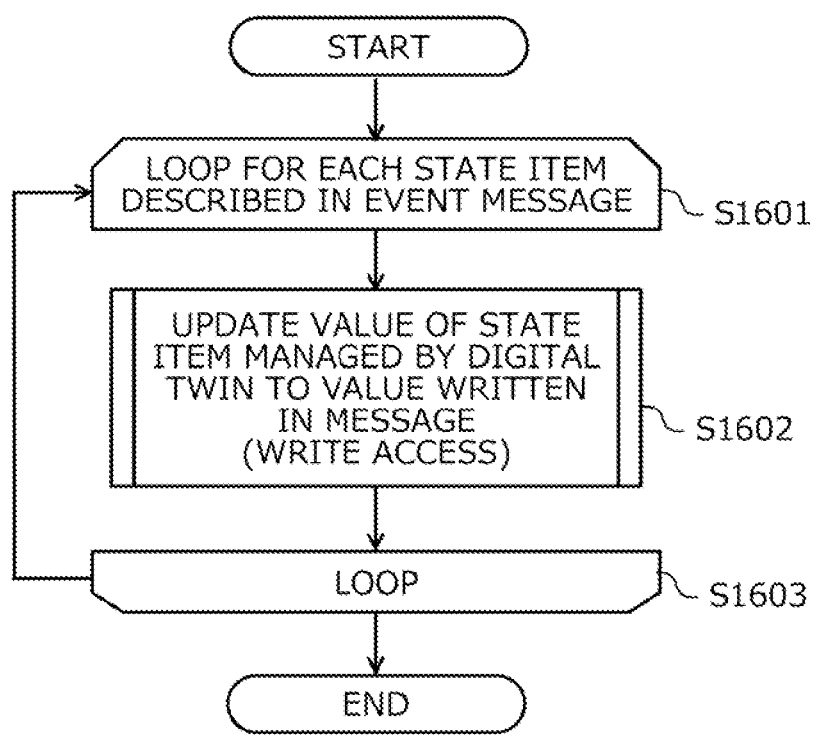
FIG. 16 is a flowchart illustrating a message processing example of the data management apparatus.

FIG. 16 is a flowchart illustrating a message processing example by the data management apparatus. FIG. 16 illustrates processing details of step S1505 in FIG. 15. The processing contents illustrated in FIG. 16 correspond to the existing message processing of the digital twin. For the processing (step S1602) illustrated in FIG. 16, the data management apparatus 100 performs loop processing until the processing for each state item described in the event message is ended.

In step S1602, the data management apparatus 100 updates the value of the state item managed in the digital twin with the value included in the event message (write access, step S1602). In the case of the state item that appears for the first time, the data management apparatus 100 newly creates a state item in the digital twin. Thereafter, in step S1603, when the processing for each state item described in the event message is not completed, the data management apparatus 100 returns to the processing in step S1601 to continue the processing. On the other hand, after the processing for all the state items is ended, the data management apparatus 100 ends the above-described processing (step S1603).

Write Access Processing Example

Figure 17:
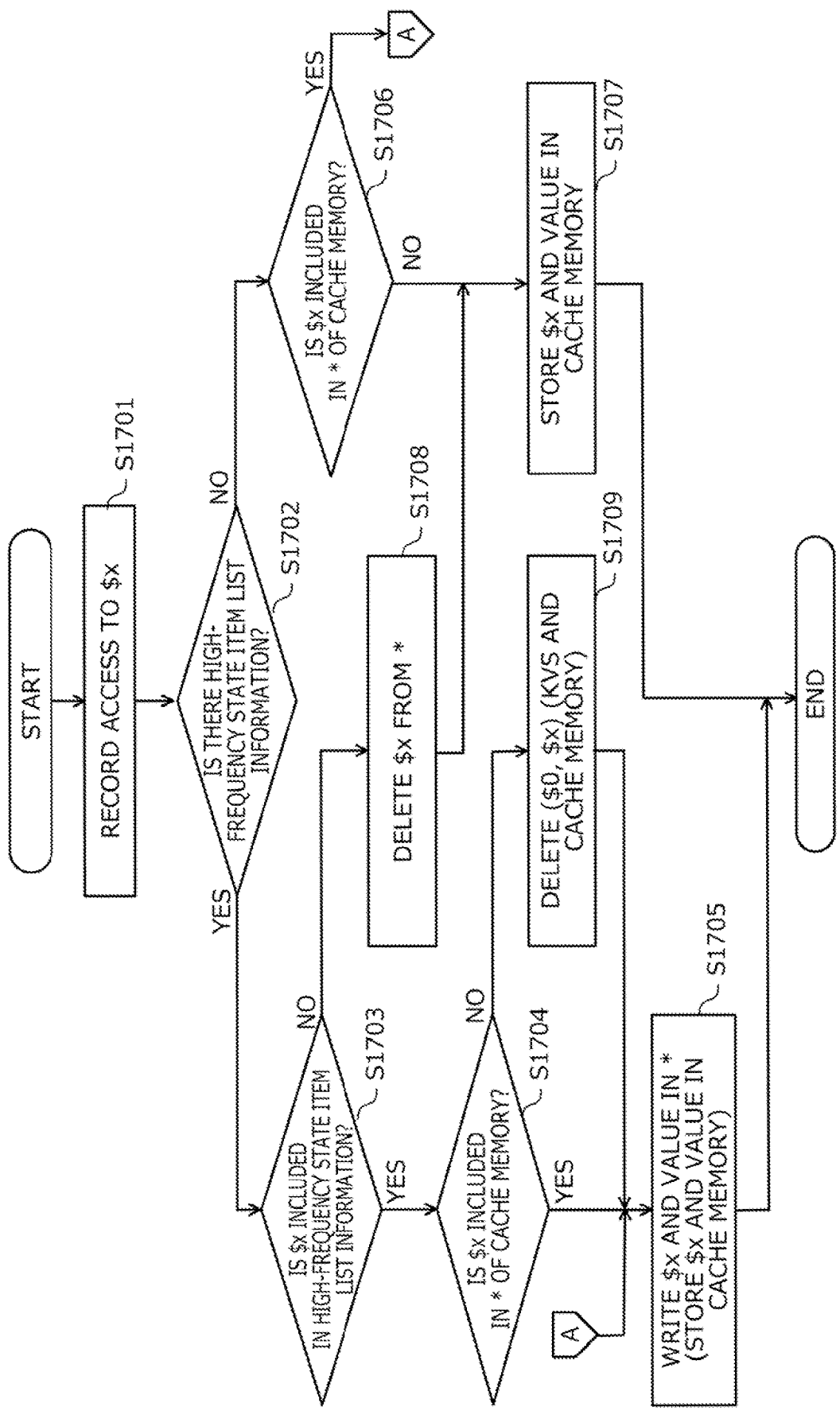
FIG. 17 is a flowchart illustrating a write access processing example performed by the data management apparatus.

FIG. 17 is a flowchart illustrating a write access processing example performed by the data management apparatus. FIG. 17 illustrates a processing example in which a write access to a state item $x of the object $0 of the digital twin is performed under the control of the user logic 220 in step S1506 in FIG. 15. First, the data management apparatus 100 records the access to $x in the access statistical information 640 (step S1701). The processing in step S1701 is executed once for each state item and for each event to be processed.

Next, the data management apparatus 100 determines whether or not there is the high-frequency state item list with reference to the high-frequency state item list information 120 (step S1702). When there is the high-frequency state item list in the high-frequency state item list information 120 (step S1702: Yes), the data management apparatus 100 proceeds to the processing in step S1703. On the other hand, when there is no high-frequency state item list in the high-frequency state item list information 120 (step S1702: No), the data management apparatus 100 proceeds to the processing in step S1706.

In step S1703, the data management apparatus 100 determines whether or not the state item $x is included in the high-frequency state item list information 120 (step S1703). When the state item $x is included in the high-frequency state item list information 120 (step S1703: Yes), the data management apparatus 100 proceeds to the processing of step S1704. On the other hand, when the state item $x is not included in the high-frequency state item list information 120 (step S1703: No), the data management apparatus 100 proceeds to the processing in step S1708.

In step S1704, the data management apparatus 100 determines whether or not $x is included in the grouped state item * of the cache memory 330 (step S1704). When $x is included in * of the cache memory 330 (step S1704: Yes), the data management apparatus 100 proceeds to the processing in step S1705. On the other hand, when $x is not included in * of the cache memory 330 (step S1704: No), the data management apparatus 100 proceeds to the processing in step S1709.

In step S1705, the data management apparatus 100 writes $x and a value of $x to * and stores $x and the value of $x in the cache memory 330 (step S1705), and ends the above-described processing.

In step S1706, the data management apparatus 100 determines whether or not $x is included in * of the cache memory 330 (step S1706). When $x is included in * of the cache memory 330 (step S1706: Yes), the data management apparatus 100 proceeds to the processing in step S1705. On the other hand, when $x is not included in * of the cache memory 330 (step S1706: No), the data management apparatus 100 proceeds to the processing in step S1707.

In step S1707, the data management apparatus 100 stores $x and the value of $x in the cache memory 330 (step S1707), and ends the above-described processing.

In step S1708, the data management apparatus 100 deletes $x from * (step S1708), and proceeds to the processing in step S1707. When $x is not included in *, the data management apparatus 100 does not execute the deletion processing.

In step S1709, the data management apparatus 100 deletes the grouped state item ($0, $x) from the KVS 110 and the cache memory 330 (step S1709), and proceeds to the processing in step S1705.

Read Access Processing Example

Figure 18:
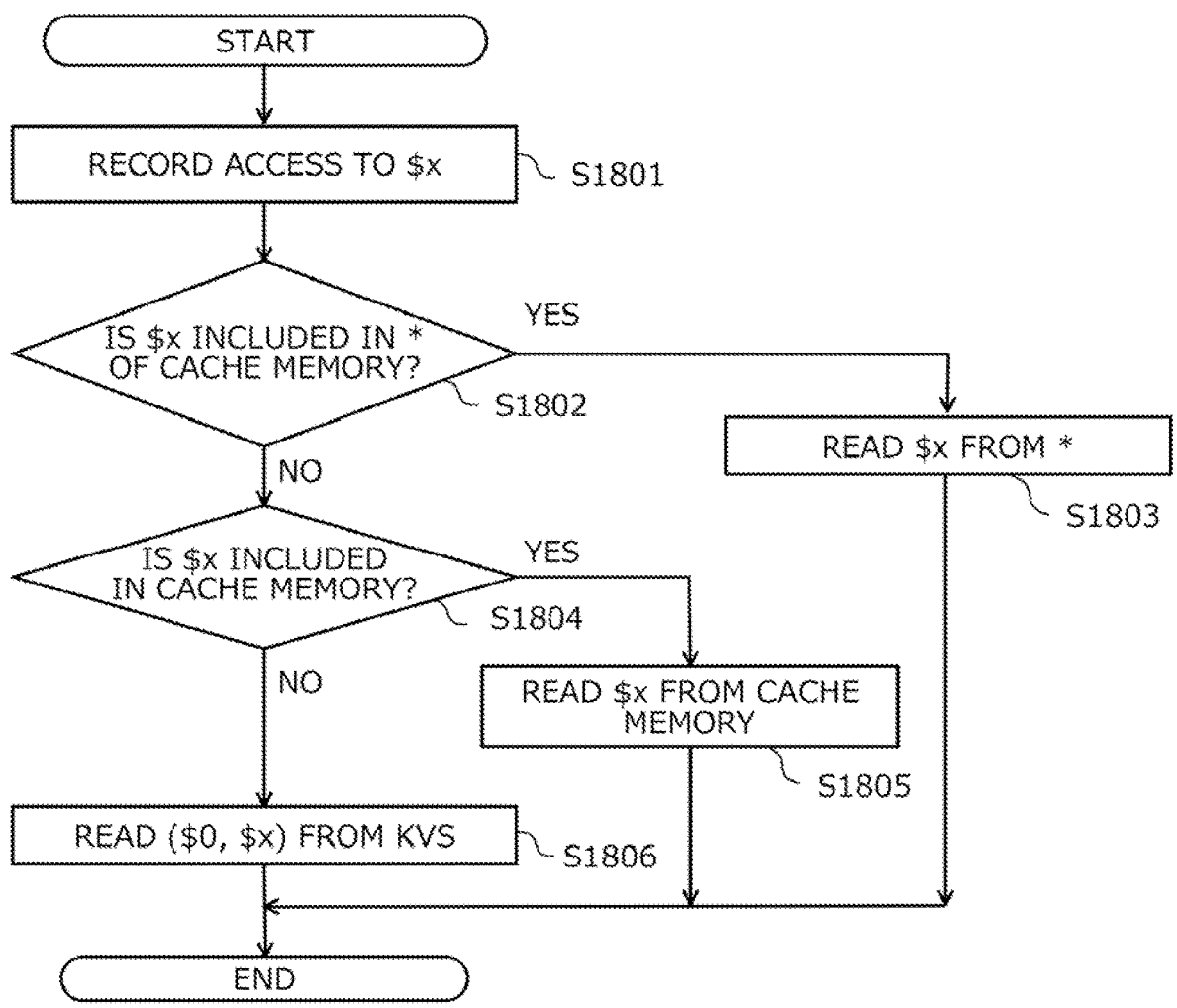
FIG. 18 is a flowchart illustrating a read access processing example performed by the data management apparatus.

FIG. 18 is a flowchart illustrating a read access processing example performed by the data management apparatus. FIG. 18 illustrates a processing example in which a read access to the state item $x of the digital twin $0 is performed under the control of the user logic 220 in step S1506 in FIG. 15. First, the data management apparatus 100 records the access to $x in the access statistical information 640 (step S1801). The processing in step S1801 is executed once for each state item and for each event to be processed.

Next, the data management apparatus 100 determines whether or not the state item $x is included in * of the cache memory 330 (step S1802). When the state item $x is included in * of the cache memory 330 (step S1802: Yes), the data management apparatus 100 proceeds to the processing in step S1803. On the other hand, when the state item $x is not included in * in the cache memory 330 (step S1802: No), the data management apparatus 100 proceeds to the processing in step S1804.

In step S1803, the data management apparatus 100 reads the state item $x from * (step S1803), and ends the above-described processing.

In step S1804, the data management apparatus 100 determines whether or not the state item $x is included in the cache memory 330 (step S1804). When the state item $x is included in the cache memory 330 (step S1804: Yes), the data management apparatus 100 proceeds to the processing in step S1805. On the other hand, when the state item $x is not included in the cache memory 330 (step S1804: No), the data management apparatus 100 proceeds to the processing in step S1806.

In step S1805, the data management apparatus 100 reads the state item $x from the cache memory 330 (step S1805), and ends the above-described processing.

In step S1806, the data management apparatus 100 reads the grouped state item ($0, $x) from the KVS 110 (step S1806), and ends the above-described processing.

High-Frequency State Item List Information Creation Processing Example

Figure 19A:
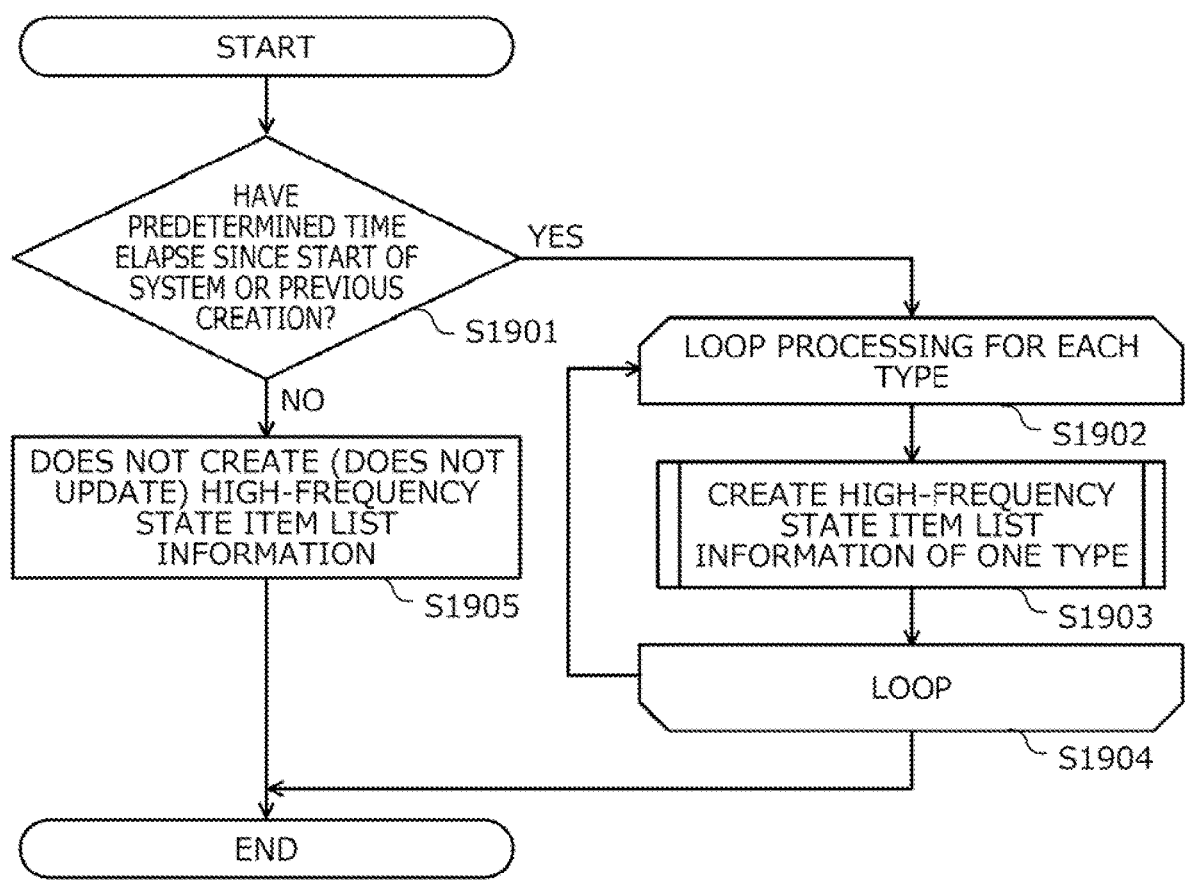
FIG. 19A is a flowchart of a high-frequency state item list information creation processing example performed by the data management apparatus (part 1)
Figure 19B:
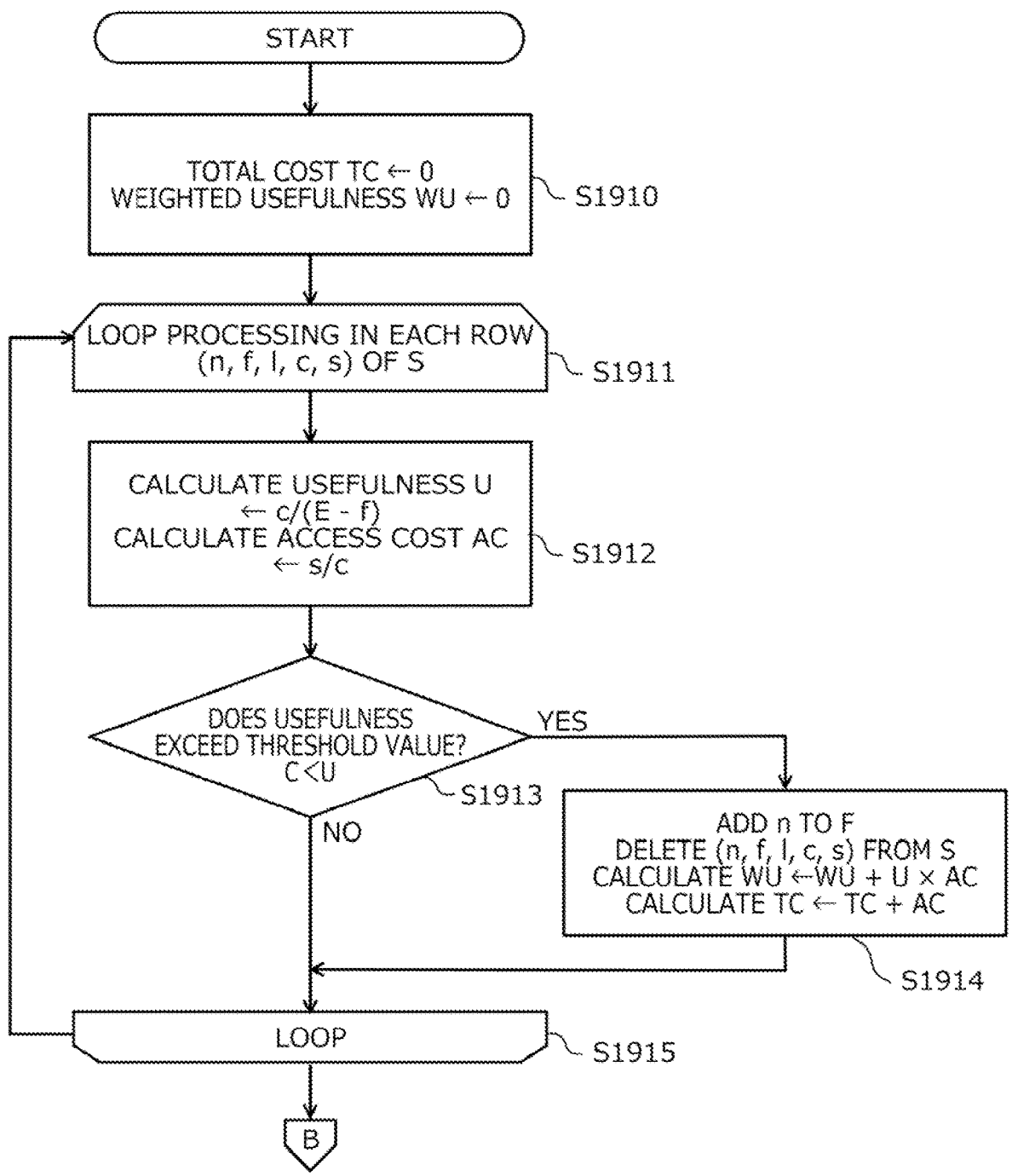
FIG. 19B is a flowchart of the high-frequency state item list information creation processing example performed by the data management apparatus (part 2)
Figure 19C:
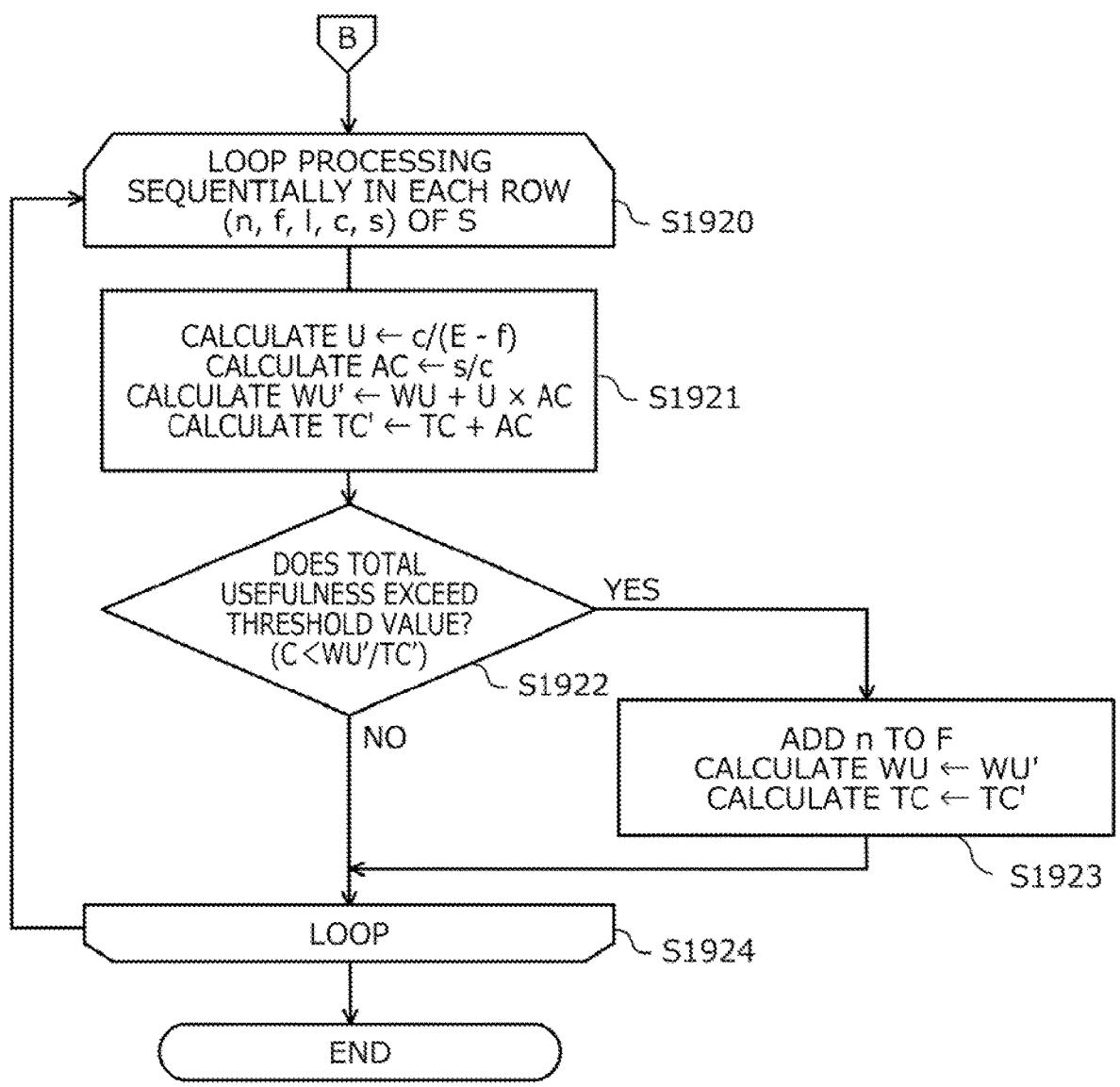
FIG. 19C is a flowchart of the high-frequency state item list information creation processing example performed by the data management apparatus (part 3)

FIGS. 19A to 19C are flowcharts of a high-frequency state item list information creation processing example performed by the data management apparatus. FIG. 19A is the entire processing of creating the high-frequency state item list information, and illustrates the details of the processing in step S1507 in FIG. 15.

In FIG. 19A, first, the data management apparatus 100 determines whether or not a predetermined time elapses since the system is started or the high-frequency state item list information 120 is previously created (step S1901). When the predetermined time has elapsed since the system is stated or since the high-frequency state item list information 120 is previously created (step S1901: Yes), the data management apparatus 100 proceeds to the processing in step S1902. On the other hand, when the predetermined time has not elapsed not since the system is started but since the high-frequency state item list information 120 is previously created (step S1901: No), the data management apparatus 100 proceeds to the processing in step S1905.

In step S1902, the data management apparatus 100 performs loop processing for each type by using the access statistical information 640 for each type of the digital twin (step S1902). During the loop processing, processing of creating the high-frequency state item list information 120 of one type is performed (step S1903).

Thereafter, in step S1903, when the creation processing of the high-frequency state item list information 120 of all the types is not completed, the data management apparatus 100 returns to the processing in step S1902 to continue the processing. On the other hand, when the processing of creating the high-frequency state item list information 120 of all the types is ended, the data management apparatus 100 ends the above-described processing (step S1904).

In step S1905, the data management apparatus 100 does not create the high-frequency state item list information 120 (does not update when the high-frequency state item list information 120 is already created, step S1905). Thereafter, the data management apparatus 100 ends the above-described processing.

FIGS. 19B and 19C illustrate the details of the processing in step S1903 of FIG. 19A. In FIG. 19B, the data management apparatus 100 acquires pieces of data of a table S, an event index E, and a threshold value C of the usefulness of the access statistical information 640 of one type, and executes the following processing. As illustrated in FIGS. 12A to 12C, in the table S of the access statistical information 640, pieces of data of a state item (name) n, a first detection index f, a last detection index I, the number of accesses c, and a total size s are stored in columns for each state item in vertical rows. The data management apparatus 100 uses the last detection index I to execute recording only once for one event message.

First, the data management apparatus 100 sets total cost TC (total cost) to 0 and weighted usefulness WU to 0 (step S1910). Next, the data management apparatus 100 performs loop processing for each row (n, f, I, c, s) of the table S for the plurality of state items (step S1911).

In this loop processing, the data management apparatus 100 calculates usefulness U and access cost AC for one state item (step S1912). For example, the data management apparatus 100 calculates the usefulness (access probability) U based on $c/(E-f)$. For example, the data management apparatus 100 calculates the access cost AC based on $s/c$ which is an average size of the state item.

Next, the data management apparatus 100 determines whether or not the usefulness U exceeds the threshold value C ($C<U$) (step S1913). When the usefulness U exceeds the threshold value C (step S1913: Yes), the data management apparatus 100 proceeds to the processing in step S1914. On the other hand, when the usefulness U does not exceed the threshold value C (step S1913: No), the data management apparatus 100 proceeds to the processing in step S1915.

In step S1914, the data management apparatus 100 adds n to an output F of the high-frequency state item list information 120 (table S) of the type being processed. The data management apparatus 100 deletes (n, f, I, c, s) from the table S. For example, the data management apparatus 100 calculates the weighted usefulness WU based on WU+U×AC. The data management apparatus 100 calculates the total cost TC based on, for example, TC+AC (step S1914).

In step S1915, the data management apparatus 100 returns to the processing in step S1911 to continue the above-described processing when the processing for all other types is completed, and proceeds to the processing in step S1920 (FIG. 19C) when the processing for all the types is ended.

Next, in step S1920 of FIG. 19C, the data management apparatus 100 performs loop processing in a predetermined order, for example, in order (ascending order) from the state item having the small size in each row (n, f, I, c, s) of the table S (step S1920). For example, the data management apparatus 100 determines the order based on $(1-c/(E-f)) \times s/c$.

In this loop processing, the data management apparatus 100 calculates the usefulness U, the access cost AC, weighted usefulness WU', and total cost TC' for one state item (step S1921). For example, the data management apparatus 100 calculates the usefulness U based on $c/(E-f)$. For example, the data management apparatus 100 calculates the access cost AC based on $s/c$. For example, the data management apparatus 100 calculates the weighted usefulness WU' based on WU+U×AC. For example, the data management apparatus 100 calculates the total cost TC' based on TC+AC.

Next, the data management apparatus 100 determines whether or not total usefulness (WU'/TC') exceeds the threshold value C (C<WU'/TC') (step S1922). When the total usefulness exceeds the threshold value C (step S1922: Yes), the data management apparatus 100 proceeds to the processing in step S1923. On the other hand, when the total usefulness does not exceed the threshold value C (step S1922: No), the data management apparatus 100 proceeds to the processing in step S1924.

In step S1923, the data management apparatus 100 adds n to the output F of the high-frequency state item list information 120 (table S) of the type being processed. The data management apparatus 100 sets total usefulness WU' as the weighted usefulness WU. The data management apparatus 100 sets the total cost TC' as the total cost TC (step S1923).

In step S1924, the data management apparatus 100 returns to the processing in step S1920 to continue the above-described processing when the processing for all the other types is not completed, and ends the above-described processing when the processing for all the types is ended. When this processing is ended, the data management apparatus 100 outputs the high-frequency state item list information F (120) for each type, and proceeds to the processing in step S1904 in FIG. 19A.

(Cache Memory Flushing Processing)

Figure 20:
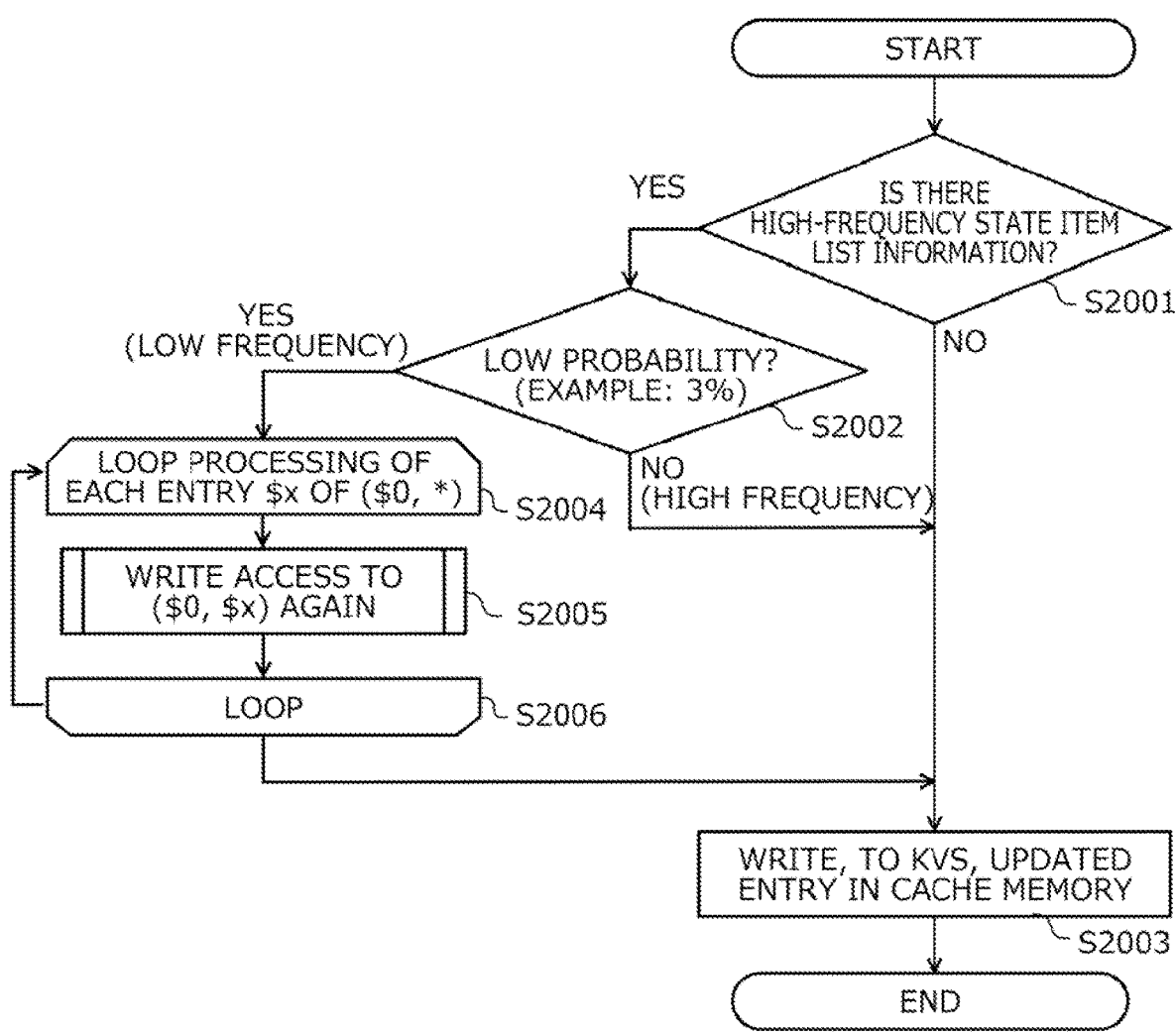
FIG. 20 is a flowchart illustrating a flushing processing example performed by the data management apparatus.

FIG. 20 is a flowchart illustrating a flushing processing example performed by the data management apparatus. FIG. 20 is a diagram illustrating a flushing processing example on the cache memory 630 in step S1508 in FIG. 15. First, the data management apparatus 100 determines whether or not there is the high-frequency state item list information 120 (step S2001). When there is the high-frequency state item list information 120 (step S2001: Yes), the data management apparatus 100 proceeds to the processing of step S2002. On the other hand, when there is no high-frequency state item list information 120 (step S2001: No), the data management apparatus 100 proceeds to the processing in step S2003.

In step S2002, the data management apparatus 100 determines whether or not a probability (for example, the access probability U) of each high-frequency state item set in the high-frequency state item list information 120 is a probability lower than a predetermined threshold value (for example, 3%) (step S2002). When the probability of the state item exceeds the threshold value (step S2002: No), the state item has a high frequency and thus the data management apparatus 100 proceeds to the processing in step S2003. On the other hand, when the probability of the state item is lower than the threshold value (step S2002: Yes), the state item has a low frequency and thus the data management apparatus 100 proceeds to the processing in step S2004 in which this state item is excluded.

In step S2004, the data management apparatus 100 performs loop processing on each entry $x of ($0, *) (step S2004). In step S2005, the data management apparatus 100 performs a write access to ($0, $x) again (see FIG. 17, step S2005). Through this WRITE access, the low-frequency state item is deleted from among the grouped high-frequency state items. In step S2006, the data management apparatus 100 proceeds to the processing in step S2004 when the processing for each entry $x of ($0, *) remains, and proceeds to the processing in step S2003 when the processing for each entry $x of ($0, *) is ended.

In step S2003, the data management apparatus 100 performs writing (flushing processing) of the updated entry in the cache memory 630 to the KVS 110 (step S2003), and ends the above-described processing.

Comparison Between Existing Technique and Embodiment

Next, the comparison between the existing technique and the embodiment will be described. First, the read and write processing is compared with reference to FIGS. 21A and 21B.

Figure 21A:
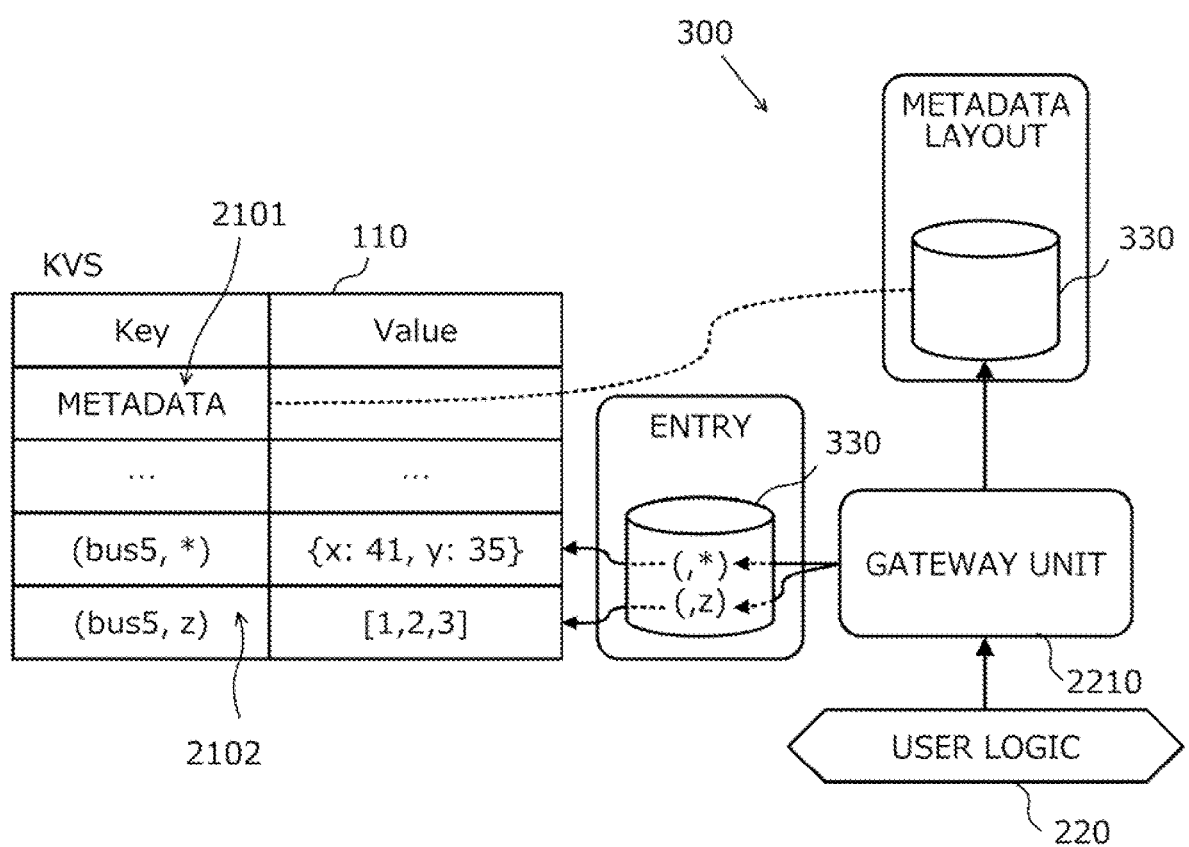
FIG. 21A is an explanatory diagram illustrating read and write processing in accordance with the existing technique.

FIG. 21A is an explanatory diagram of the read and write processing according to the existing technique. FIG. 21A illustrates an example of the third method of grouping (X, *) the high-frequency state items described above.

The data management apparatus 300 of the existing technique determines a storage location of the entry in the KVS 110, based on metadata 2101. Thus, in the existing technique, the metadata 2101, an entry 2102, and the like are cached and retained in the cache memory 330. In this case, when the state is updated by the user logic 220, a gateway unit 2210 determines an entry structure on the cache memory 330 based on only a layout of the metadata, and performs a read or write access to the state item in the KVS 110. In the existing technique, a layout (storage structure of the KVS 110) indicated by the metadata is used. When the grouping of the state items is changed based on the frequency of the state items, the change in the storage structure of the KVS 110 and the change in the metadata have to be collectively and exclusively processed. Thus, a large overhead occurs in data processing.

FIG. 21B is an explanatory diagram of read and write processing according to the embodiment. By the read processing in (a) of FIG. 21B, the grouping gateway unit 620 of the data management apparatus 100 checks the grouped state item. At this time, since the data management apparatus 100 prefetches the entry 2102 in the cache memory 630 in advance, access may be performed in a short time. When there is no grouped state item, the grouping gateway unit 620 may access the KVS 110 as the individual entry.

In the WRITE processing in (b) of FIG. 21B, when there is the high-frequency state item list information 120, the grouping gateway unit 620 of the data management apparatus 100 may execute the maintenance of the grouped state item with reference to the high-frequency state item list information 120.

As described above, according to the embodiment, the entries of the high-frequency state items are grouped, and thus, even though the number of state items is large, the access to the KVS 110 is performed only once whenever the event message is processed. Accordingly, the efficiency of the access may be increased. The event information is prefetched in advance at the beginning of the processing of the event message, and thus, the waiting time may be further reduced. Although access occurs by setting the low-frequency state item as the individual entry, the access is performed with a low frequency. Thus, the overall performance is not affected. Since the low-frequency state item is not included in the grouped high-frequency state item, unnecessary I/O or data transfer may be avoided. Accordingly, the access time to the state information stored in the KVS 110 may be shortened, and the event processing of the digital twin may be speeded up.

Figure 22A:
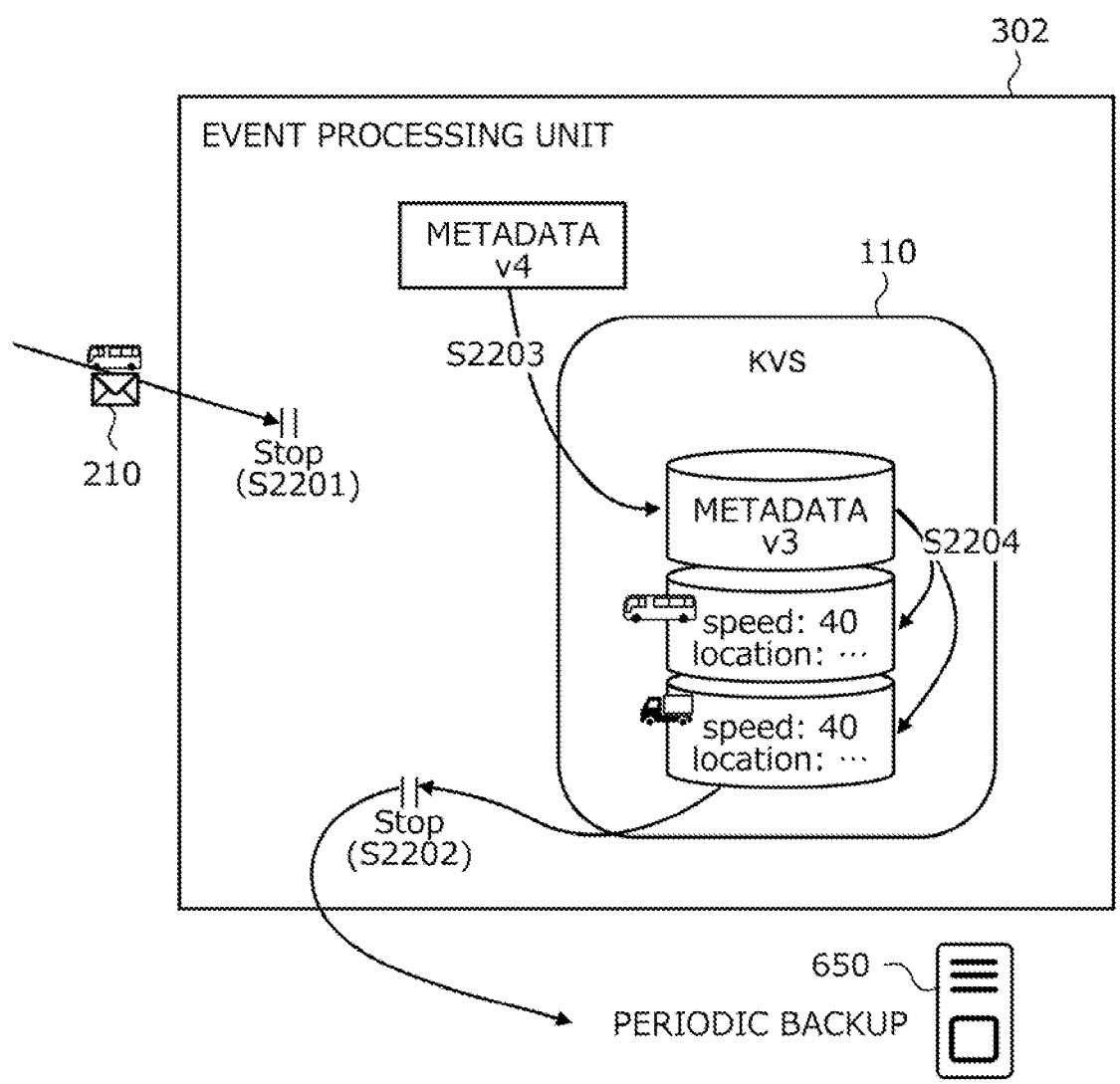
FIG. 22A is an explanatory diagram of maintenance processing of a grouped state item in accordance with the existing technique.
Figure 22B:
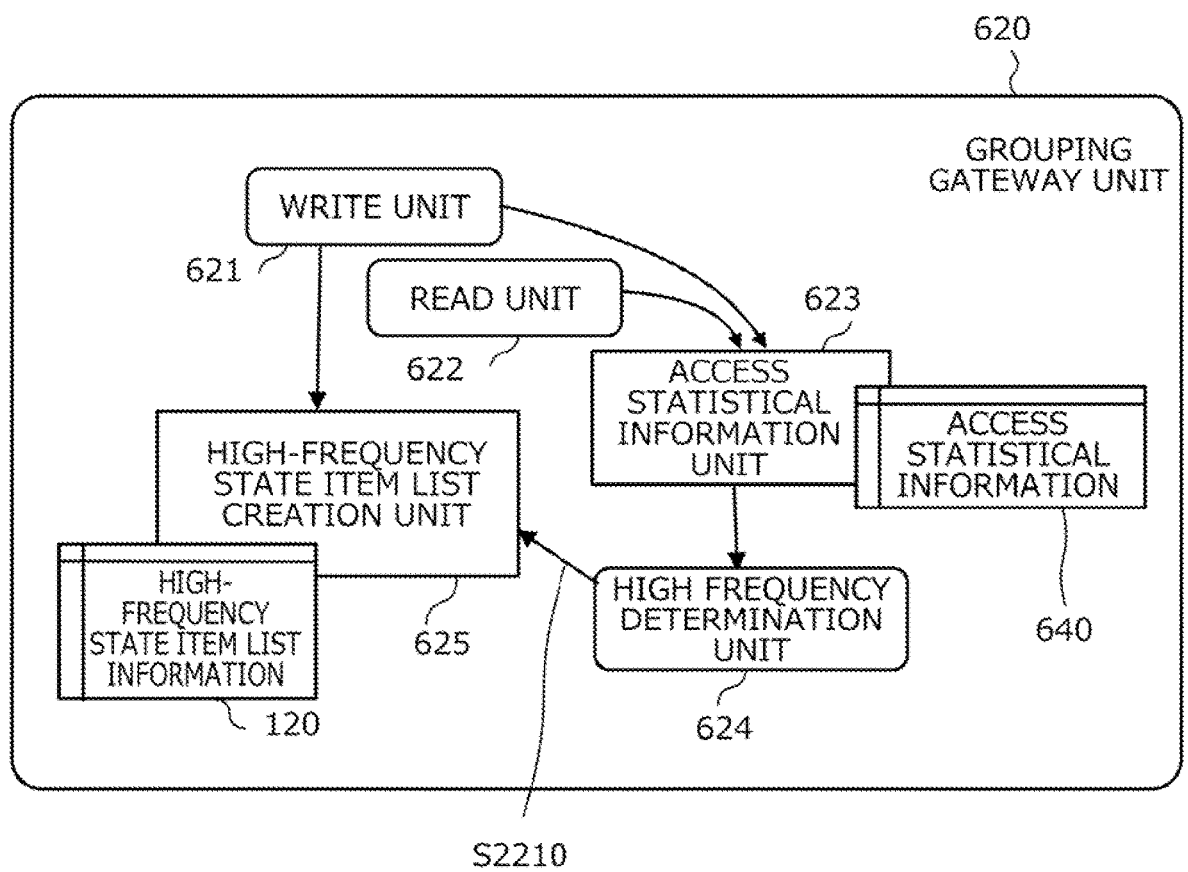
FIG. 22B is an explanatory diagram of maintenance processing of a grouped state item in accordance with the embodiment.

Next, maintenance processing of the grouped state item will be compared with reference to FIGS. 22A and 22B.

FIG. 22A is an explanatory diagram of the maintenance processing of the grouped state item according to the existing technique. When the maintenance processing of the grouped state item is performed, the event processing unit 302 of the data management apparatus 300 of the existing technique has to exclusively execute the following procedures 1. to 3.

1. The input of the event message 210 is temporarily stopped (step S2201). The backup of the data in the KVS 110 to the backup server 650 is temporarily stopped (step S2202).

2. The metadata of the KVS 110 is updated (step S2203). In the illustrated example, metadata v3 is updated with metadata v4 for update.

3. The storage structures of all the digital twins classified into the same type are collectively updated (step S2204). As the number of digital twins increases, a processing load of this processing increases.

FIG. 22B is an explanatory diagram of the maintenance processing of the grouped state item according to the embodiment. In the embodiment, the grouping gateway unit 620 of the data management apparatus 100 performs only 1. the determination of the high-frequency state item with the high frequency determination unit 624 (step S2210).

The data management apparatus 100 performs actual maintenance asynchronously for each digital twin. The data management apparatus 100 executes this maintenance together with predetermined write processing. Each digital twin may have a different storage structure. In many cases, the state included in the high-frequency state item list information 120 is updated when the event message from the IoT device 200 is received in the digital twin. Thus, the data management apparatus 100 simultaneously executes processing that is performed when the event message is received and processing of updating the high-frequency state item list information 120 for maintenance, and performs processing of writing a result of this simultaneously performed processing to the KVS 110 once for the KVS 110. Consequently, extra write processing does not occur for the KVS 110 due to the maintenance of the high-frequency state item list information 120.

The data management apparatus 100 according to the embodiment described above creates, based on an access frequency to a data store when a predetermined data processing program performs data processing, high-frequency state item list information obtained by listing high-frequency state items of which the access frequency is high. When state information including a value of a high-frequency state item is written to the data store, the data management apparatus 100 determines whether or not the state information corresponds to the high-frequency state item with reference to the high-frequency state item list information. The data management apparatus 100 groups and writes pieces of the state information of a plurality of the high-frequency state items in one record of the data store when it is determined that the state information corresponds to the high-frequency state item. On the other hand, when it is determined that the state information does not correspond to the high-frequency state item, the data management apparatus 100 writes the state information in one record in the data store. Consequently, according to the data management apparatus 100, the storage structure of the data store may be dynamically changed and optimized by flexibly coping with the change in the access frequency of each state item to the data store. According to the data management apparatus 100, the frequently updated pieces of state information are grouped and stored in the data store, and thus, the pieces of state information of the plurality of state items may be written by one access to the data store. For example, the access time to the data store in processing of event messages input from a large number of IoT devices may be shortened, and the event processing of the digital twins may be speeded up. According to the data management apparatus 100, for example, access to special metadata may not be performed, and extra overhead processing for changing the storage structure of the data store does not occur.

In the creating, the data management apparatus 100 creates, based on an access frequency of each state item to the data store, the high-frequency state item list information obtained by listing a plurality of high-frequency state items of which the access frequency is higher than a predetermined threshold value. Consequently, according to the data management apparatus 100, the high-frequency state item list information may be dynamically updated in accordance with the access frequency of the high-frequency state item.

The data store of the data management apparatus 100 may be a key value store (KVS) and a cache memory. In this case, the data management apparatus 100 performs the writing on the cache memory and flushes the cache data from the cache memory to the KVS at a predetermined timing. Consequently, the data management apparatus 100 may dynamically change the storage structure in the cache memory, may group pieces of frequently updated state information, and then may reflect the storage structure in the cache memory to the storage structure in the KVS 110.

The data management apparatus 100 also performs prefetching the grouped state information that corresponds to the input state information and is stored in the KVS to the cache memory at a beginning of the processing performed by the predetermined data processing program. Consequently, according to the data management apparatus 100, the speed of the event message processing may be further speeded up by prefetching.

In the creating, the data management apparatus 100 updates the high-frequency state item list information based on the change in the access frequency to the data store. During the writing of the state information to the data store, the data management apparatus 100 asynchronously performs processing of simultaneously writing the updated high-frequency state item list information. Consequently, according to the data management apparatus 100, the storage structure of the data store may be changed in accordance with a change in the access pattern to the state item. Thus, the high-frequency state item list information may be maintained to be optimum all the time. The storage structure of the data store may be maintained to be optimum all the time. An additional access to the data store does not occur due to the change in the storage structure of the data store. Thus, an influence such as a delay in the message processing may be avoided.

In the creation processing, the data management apparatus 100 determines the high-frequency state item based on cost of accessing the data store for each state item, the number of times of data processing, and a frequency of the data processing. Consequently, according to the data management apparatus 100, the high-frequency state item may be correctly specified for each state item in accordance with the input state of the event message, the usefulness, and the like.

In the creating, the data management apparatus 100 creates the high-frequency state item list information for each kind of an external device that outputs state information that includes a value of the state item. The data management apparatus 100 performs the determining with reference to the high-frequency state item list information that corresponds to the kind of the external device. For example, in the data management apparatus 100, the predetermined data processing program includes a plurality of predetermined data processing programs for respective event messages input from a plurality of external devices of different kinds, and the plurality of predetermined data processing programs processes the respective kinds of messages. In the determining, when the state information that includes the value of the state item is written to the data store by the predetermined data processing program, the data management apparatus 100 determines whether or not one or a plurality of the state items included in the event message correspond to the high-frequency state item with reference to the high-frequency state item list information of a corresponding kind. Consequently, according to the data management apparatus 100, data processing may be performed based on an input from a wide variety of external devices such as the IoT device, and a data store suitable for each kind of the external devices may be accessed.

When the state information that includes a value of the state item is read from the data store, the data management apparatus 100 reads the grouped state information in the record in the data store or the individual state information. Consequently, the data management apparatus 100 may simply perform reading from the data store because the storage structure of the state is optimized in writing to the data store. When the reading is performed, the high-frequency state item list information may not be referred to.

The data management method described in the embodiment of the present disclosure may be realized by causing a processor of a server or the like to execute a program prepared in advance. The program of this method may be recorded on a computer-readable recording medium such as a hard disk, a flexible disk, a CD-ROM, a DVD, or a flash memory, is read from the recording medium by the computer, and is executed by the computer. The program of this method may be distributed via a network such as the Internet.

Regarding the embodiment described above, the following appendices are further disclosed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data management method causing a computer to execute processing comprising:

creating, when a predetermined data processing program performs data processing, based on an access frequency to a data store which stores a plurality of records each include a first item and a second item, high-frequency state item list information which lists high-frequency state items having high access frequency;

determining, when pieces of state information that each includes the high-frequency state item and a value of the high-frequency state item is written to the data store, whether or not each of the pieces of state information is included in the high-frequency state item list information;

grouping, when determining that one or more pieces of state information in the pieces of state information are included in the high-frequency state item list information, the high-frequency state items and the values of the high-frequency state items in the one or more pieces of state information, writing the high-frequency state items and the values of the high-frequency state items which are grouped in the second item of one record of the data store and writing an identification information for each of the pieces of state information and a specific symbol in the first item of the one record of the data store; and writing, when determining that the pieces of state information are not included in the high-frequency state item list information, each of the pieces of state information in one corresponding record of the data store.

2. The data management method according to claim 1, wherein, in the creating, based on an access frequency of each state item to the data store, the high-frequency state item list information which lists a plurality of high-frequency state items of which the access frequency is higher than a predetermined threshold value is created.

3. The data management method according to claim 1, wherein the data store is a key value store (KVS) and a cache memory, the writing is performed on the cache memory, and cache data is flushed from the cache memory to the KVS at a predetermined timing.

4. The data management method according to claim 3, further comprising: prefetching the grouped one or more pieces of state information that corresponds to the input state information and is stored in the KVS to the cache memory at a beginning of the processing performed by the predetermined data processing program.

5. The data management method according to claim 1, wherein, in the creating, the high-frequency state item list information is updated based on a change in the access frequency to the data store, and during the writing of the state information to the data store, processing of simultaneously writing the updated high-frequency state item list information is performed asynchronously.

6. The data management method according to claim 1, wherein, in the creating, the high-frequency state item is determined based on cost of accessing the data store for each state item, a number of times of data processing, and a frequency of the data processing.

7. The data management method according to claim 1, wherein, in the creating, the high-frequency state item list information is created for each kind of an external device that outputs state information that includes a value of the state item, and the determining is performed with reference to the high-frequency state item list information that corresponds to the kind of the external device.

8. The data management method according to claim 7, wherein the predetermined data processing program includes a plurality of predetermined data processing programs for respective event messages input from a plurality of external devices of different kinds, and the plurality of predetermined data processing programs processes the respective kinds of messages, and in the determining, when the state information that includes the value of the state item is written to the data store by the predetermined data processing program, whether or not one or a plurality of the state items included in the event message correspond to the high-frequency state item is determined with reference to the high-frequency state item list information of a corresponding kind.

9. The data management method according to claim 8, wherein the external device is an IoT device, and the event message that includes the state information of a state and a value detected by the IoT device is periodically input.

10. The data management method according to claim 1, wherein when state information that includes a value of the state item is read from the data store, the grouped state information in the record of the data store or the individual state information is read.

11. A non-transitory computer-readable recording medium storing a data management program causing a computer to execute processing comprising:

creating, when a predetermined data processing program performs data processing, based on an access frequency to a data store which stores a plurality of records each include a first item and a second item, high-frequency state item list information which lists high-frequency state items having high access frequency;

determining, when pieces of state information that includes the high-frequency state item a value of the high-frequency state item is written to the data store, whether or not each of the pieces of state information is included in the high-frequency state item list information;

grouping, when determining that one or more pieces of state information in the pieces of state information are included in the high-frequency state item list information, the high-frequency state items and the values of the high-frequency state items in the one or more pieces of state information;

writing the high-frequency state items and the values of the high-frequency state items which are grouped in the second item of one record of the data store;

writing an identification information for each of the pieces of state information and a specific symbol in the first item of the one record of the data store; and writing, when determining that the pieces of state information are not included in the high-frequency state item list information, each of the pieces of state information in one corresponding record of the data store.

* * * * *